United States Patent
Huard et al.

(12) 
(10) Patent No.: US 6,507,353 B1
(45) Date of Patent: Jan. 14, 2003

(54) INFLUENCING VIRTUAL ACTORS IN AN INTERACTIVE ENVIRONMENT

(76) Inventors: Godot Huard, 4402 Christophe-Colomb, Montréal (CA); Philippe Fortier, 4348 Des Érables, Montréal (CA)

(*) Notice: Subject to any disclaimer, the term of this patent is extended or adjusted under 35 U.S.C. 154(b) by 0 days.

(21) Appl. No.: 09/459,049

(22) Filed: Dec. 10, 1999

(51) Int. Cl.$^7$ ................................. G06F 3/00

(52) U.S. Cl. ................... 345/863; 345/419; 345/420; 345/751; 345/757; 345/848

(58) Field of Search ................ 345/863, 473, 345/419, 420, 848, 849, 751, 753, 757, 100, 156

(56) References Cited

U.S. PATENT DOCUMENTS

| | | | |
|---|---|---|---|
| 5,139,261 A | | 8/1992 | Openiano ................ 463/36 |
| 5,498,002 A | | 3/1996 | Gechter ................ 463/31 |
| 5,563,988 A | * | 10/1996 | Maes et al. ................ 345/421 |
| 5,602,978 A | | 2/1997 | Lastinger ................ 345/419 |
| 5,616,078 A | | 4/1997 | Oh |
| 5,646,677 A | | 7/1997 | Reber ................ 725/139 |
| 5,655,909 A | | 8/1997 | Kitchen et al. ................ 434/44 |
| 5,732,232 A | * | 3/1998 | Brush, II et al. ................ 345/751 |
| 5,768,393 A | | 6/1998 | Mukojima et al. ................ 381/17 |
| 5,850,352 A | * | 12/1998 | Moezzi et al. ................ 364/514 |
| 5,860,811 A | | 1/1999 | Henderson ................ 434/255 |
| 5,880,731 A | * | 3/1999 | Liles et al. ................ 345/839 |
| 5,890,995 A | | 4/1999 | Bobick et al. ................ 482/4 |
| 5,926,179 A | * | 7/1999 | Matsuda et al. ................ 345/848 |
| 5,977,968 A | * | 11/1999 | Le Blanc ................ 345/764 |
| 6,002,808 A | * | 12/1999 | Freeman ................ 382/288 |
| 6,057,856 A | * | 5/2000 | Miyashita et al. ................ 345/435 |
| 6,270,414 B2 | * | 8/2001 | Roelofs ................ 345/156 |
| 6,285,380 B1 | * | 9/2001 | Perlin et al. ................ 345/473 |

FOREIGN PATENT DOCUMENTS

WO WO 99/34276 7/1999

OTHER PUBLICATIONS

"The Virtual Oceanarium" by Torsten Fröhlich, Fraunhofer Institute for Computer Graphics, Communications of the ACM, Jul. 2000, vol. 43, No. 7, pp. 95, 97, 98,99, and 101.
"Molecular Dynamics Simulation in Virtual Environments" by Zhuming Ai and Torsten Frölich, Dept. of Visualization and Virtual Reality, Fraunhofer Institute for Computer Graphics, Darmstadt, Germany, EUROGRAPHICS '98, N. Ferreira and M. Göbel, vol. 17, (1998) No. 3, 1998, pp. C–; C–269, C–271, C–273.

(List continued on next page.)

Primary Examiner—Raymond J. Bayerl
Assistant Examiner—Cuong T. Thai

(57) ABSTRACT

The described methods are directed to influencing movement of virtual actors in an interactive theater. This interactive theater can be in the shape of a dome. A method for generating a behavior vector for a virtual actor in an interactive theatre by interpreting stimuli from visitors is provided. The method comprises: providing a plurality of sensors detecting and sensing at least one physical characteristic at a plurality of positions within a theater area within which a number of visitors are free to move about, the sensors generating sensor signals; interpreting the sensor signals to provide at least one physical characteristic signal including position information, wherein the physical characteristic signal provides information on visitor activity and location within the theater area; providing a behavior model for at least one virtual actor; analyzing the at least one physical characteristic signal and the behavior model for the at least one virtual actor to generate a behavior vector of the at least one virtual actor using the position information and the at least one physical characteristic signal, whereby a virtual actor reacts and interacts with visitors. The methods also comprise using a generated virtual environment stimulus and generating new actors.

22 Claims, 11 Drawing Sheets

OTHER PUBLICATIONS

Integration of Multidimensional Interaction Devices in Real–Time Computer Graphics Applications, Torsten Fröhlich, Marcus Roth, Dept. Visualization and Virtual Reality, Fraunhofer Institute for Computer Graphics, Darmstadt, Germany, EUROGRAPHICS '2000, m. Gross and F.R.A. Hopgood, vol. 19, (2000), No. 3, pp. C–315, C–317, and C–319.

Artificial Fishes: Autonomous Locomotion, Perception, Behavior, and Learning in a Simulated Physical World, Dept. of Computer Science, University of Toronto, CANADA, 1995 Massachusetts Institute of Technology, Artificial Life 1, (1995) pp.: 327–351.

"Awareness, Focus and Aura, A Spatial Model for Interaction in Virtual Worlds", Steven Benford, Dept. of Computer Science, University of Nottingham, NG7 2RD, UK; Lennart E. Fahlén, Swedish Institute of Computer Science, (SICS), S–16426, SWEDEN,pp. 694, 696, 698.

Schmidt, H; "Zimmer denkt mit", Chip Zeitschrift Fuer, Mikrocomputer–Technik, de Vogel Verlag, Wurzburg, Magazin Intelligente Räume, No. 6, Jun. 6, 1996, pp. 54–56, XP 000598130, ISSN:0170–6632.

Ai, Z.; Fröhlich T: "Molecular Dynamics Simulation in Virtual Environments", Computer Graphics Forum (Eurographics'98 Proc.), 15(3): 267–273, 1998.

Stricker, D.; Fröhlich T.; Söller–Eckert, C.: "The Augmented Man", abstract of Proceedings of International Symposium Augmented Realiy (ISAR '00), Munich, Germany, 2000.

Torsten Frohlich, the Virtual Oceanarium, published on the Internet until Aug. 8, 2002 at http://www.igd.fhg.de/igd–a4/projects/oceanarium/oceanarium.html, Fraunhofer, Institut Graphische Datenverarbeitung, 1998.

* cited by examiner

FIG_1

FIG_4

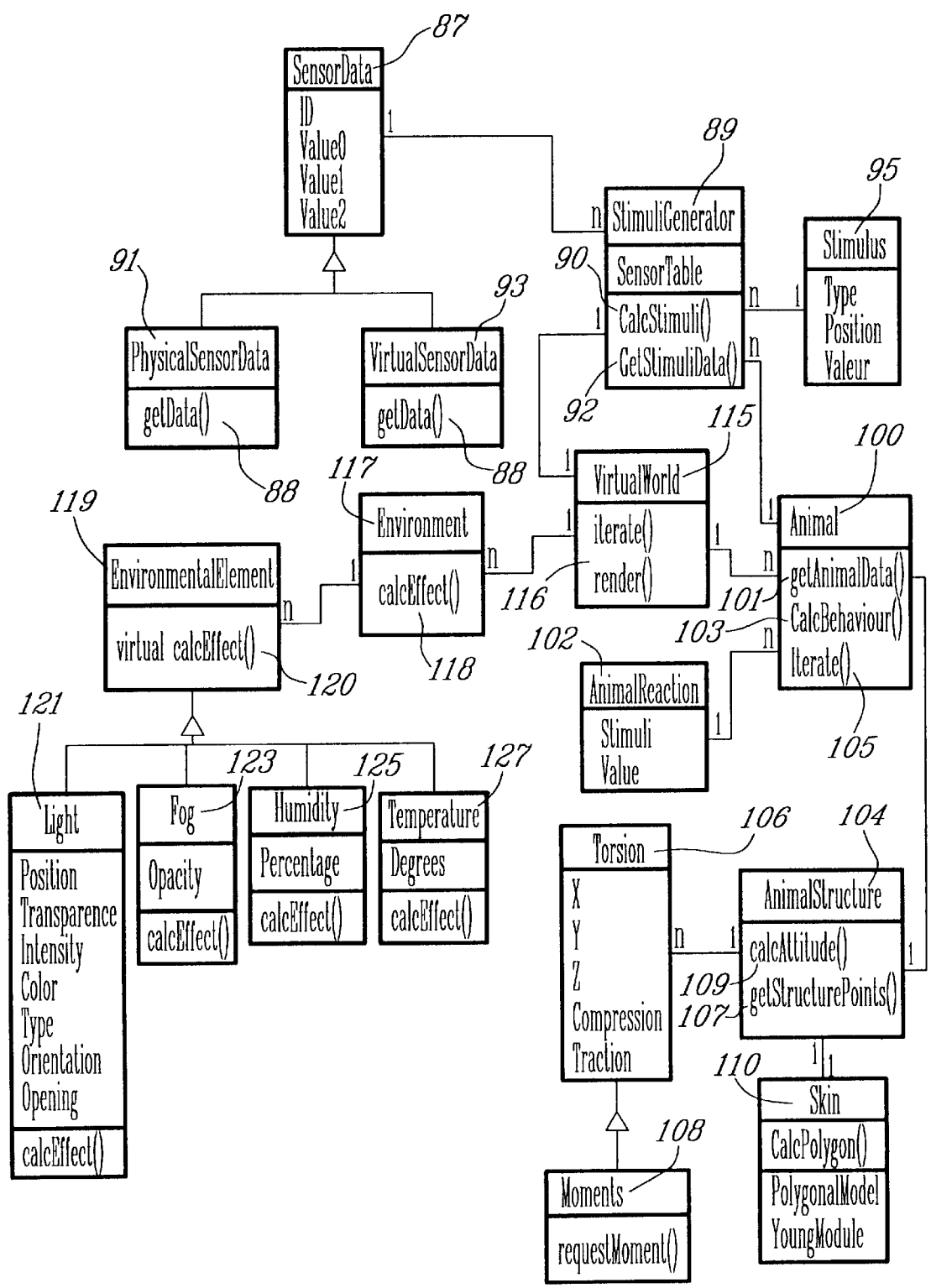

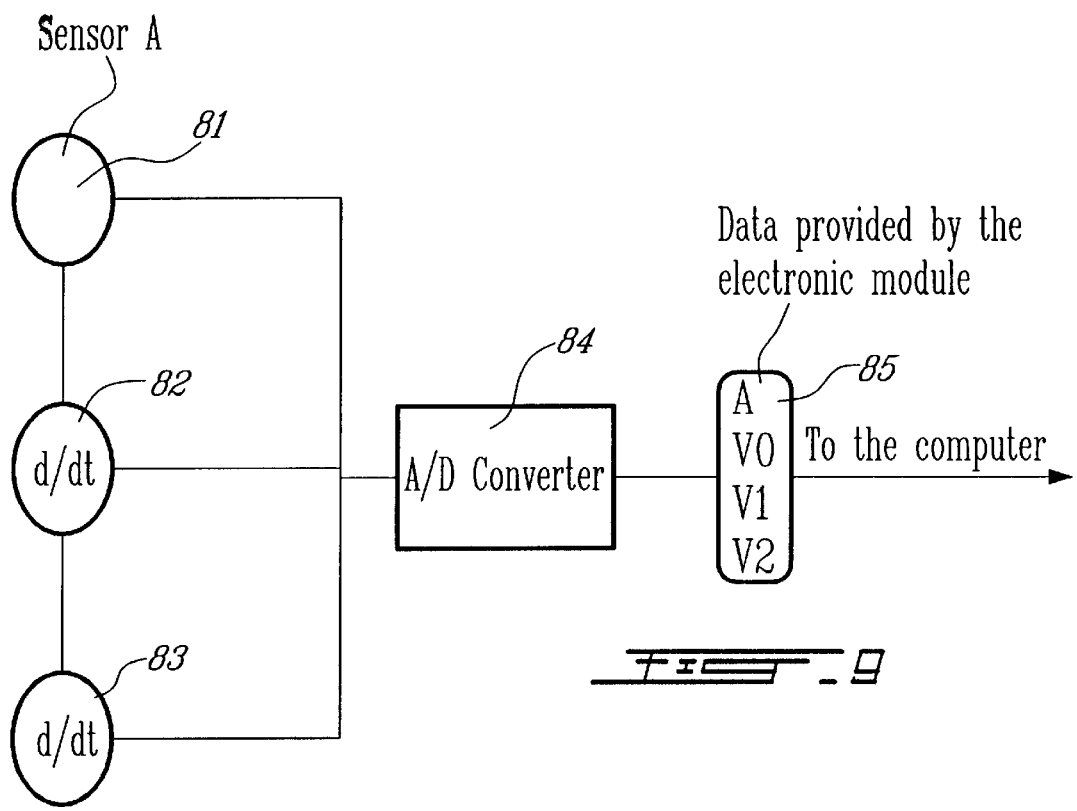
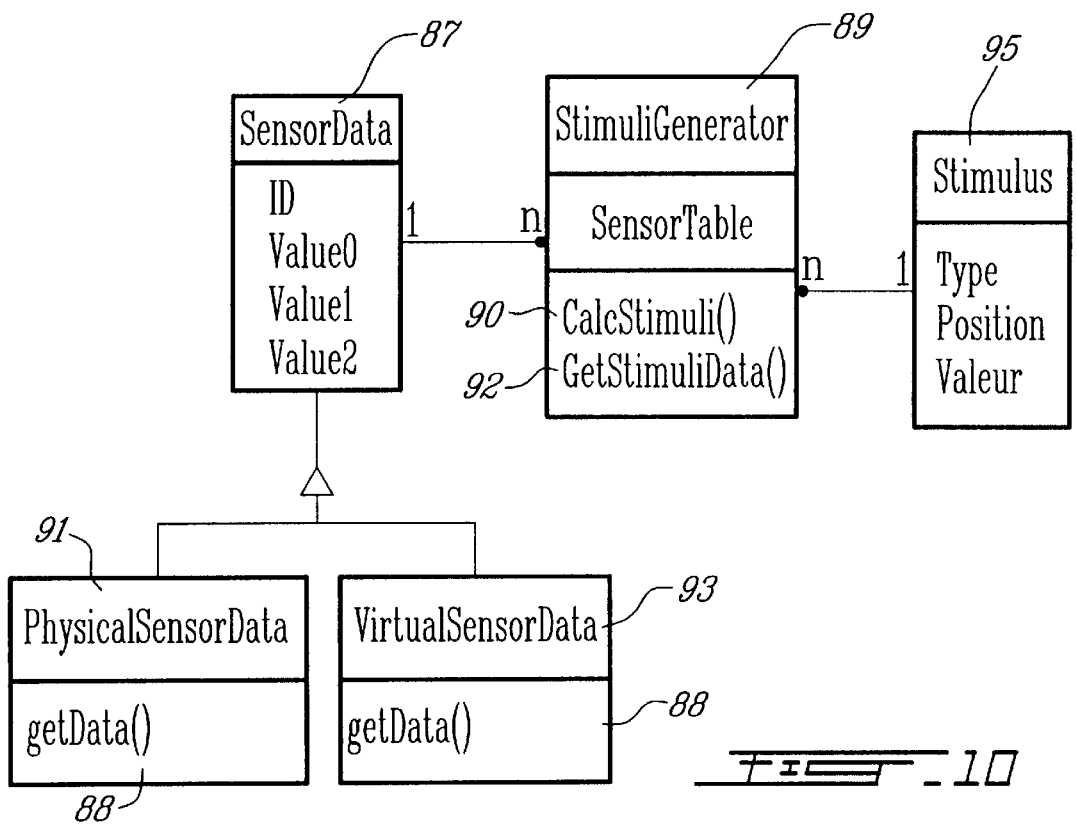

INFLUENCING VIRTUAL ACTORS IN AN INTERACTIVE ENVIRONMENT

FIELD OF THE INVENTION

The invention relates to virtual environments in which user interaction with the environment modifies the behavior of the virtual actors. The interaction of the user can be through movement or sound.

BACKGROUND OF THE INVENTION

The creation of interactive games and environments requires complex computer programs and systems. The most important part of the developer's work is to create a model that will satisfy all requirements while making coding simpler by defining relationships between modules and components. From this model, the developer can identify key functions and items that will need to be persistent.

The animal kingdom has always captivated the human being's imagination. Researchers and scientists have long wanted to live with the animals in their habitat in order to study their behaviors. Marine animals are especially interesting in that studying them requires special equipment and skills. Through years of expensive study and research, scientists have identified behaviors that are specific to certain species. Through zoos, aquariums and museums, this information on the animal kingdom has been available to the public.

Combining the security of a controlled environment with the possibility to interact almost naturally with animal kind has always been a dream. Zoos and aquariums have been built to let the population see the animals and fish in their habitats. However, the conditions in which these animals live are often an outrage and they develop an indifference to human visitors which is non-characteristic of their wild counterparts. The habits of these species are modified in the enclosed environment and do not represent the real activities and behaviors of the species.

The creation of new animations, closer than ever to reality, has suggested a new way of observing nature. If humans are able to reproduce the behaviors of animals as they are in the wild, the population will be able to better understand the world around it. However, looking at animated scenes of wildlife is interesting in so much as there is an interest for the observer. For example, if a student is doing a research paper on the habits of gorillas in the African forests, looking at an animated scene showing the silver back gorilla attack a leopard to protect his herd will be highly useful. If, on the other hand, a scientist is trying to teach to a group of visiting children that belugas are curious by nature and that they will likely pursue the object of their concentration if it is new to them, merely looking at a scene where a beluga chases floating particles will not have great success.

The Virtual FishTank™ at the Computer Museum in Boston, Mass. is a good example of a virtual undersea simulation. Visitors create virtual cartoon-like fish, can give them particular features and characteristics and observe the effects of such features on the behavior of the fish. The schooling effect is also demonstrated. A special station, in front of a window to this virtual aquarium, allows the fish to detect the presence of a human with sensors and, via a digital video camera, to react to his movements. This exhibit, however, only explores the virtual aspects of fish and does not incorporate other biophysical models. Also, it allows the virtual fish to react to the presence of one human being, without taking into account the surrounding humans and their actions.

Virtual Reality development has produced promising results over the last years. However, while being able to navigate through virtual reality environments, the user cannot interact directly since he is bound to experiment with the pre-set scenarios of the apparatus. Giving a personality and a behavior model for a virtual reality module would require enormous processing time and could not be implemented efficiently. The gaming industry is therefore still reluctant to use the virtual reality modules as a replacement of adrenaline-driven games where a limited interaction with the actors is possible.

SUMMARY OF THE INVENTION

It is an object of the present invention to provide a method for interacting with virtual actors in an interactive environment.

It is another object of the present invention to simulate "real-life" behaviors, of the virtual actors.

The present invention is directed to a method for generating a behavior vector for a virtual actor in an interactive theatre by interpreting stimuli from visitors, the method comprising: 1. providing a plurality of sensors detecting and sensing at least one physical characteristic at a plurality of positions within a theatre area within which a number of visitors are free to move about, the sensors generating sensor signals; 2. interpreting the sensor signals to provide at least one physical characteristic signal including position information, wherein said physical characteristic signal provides information on visitor activity and location within the theater area; 3. providing a behavior model for at least one virtual actor; and 4. analyzing the at least one physical characteristic signal and the behavior model for said at least one virtual actor to generate a behavior vector of the at least one virtual actor using the position information and the at least one physical characteristic signal, whereby a virtual actor reacts and interacts with visitors.

BRIEF DESCRIPTION OF THE DRAWINGS

These and other features, aspects and advantages of the present invention will become better understood with regard to the following description and accompanying drawings wherein:

FIG. 8 is an overall class diagram according to Example 1;

FIG. 9 is an illustration of the physical environment module according to Example 1;

FIG. 10 is a class diagram for the virtual environment module according to Example 1;

DETAILED DESCRIPTION OF THE PREFERRED EMBODIMENT

Figure 1:
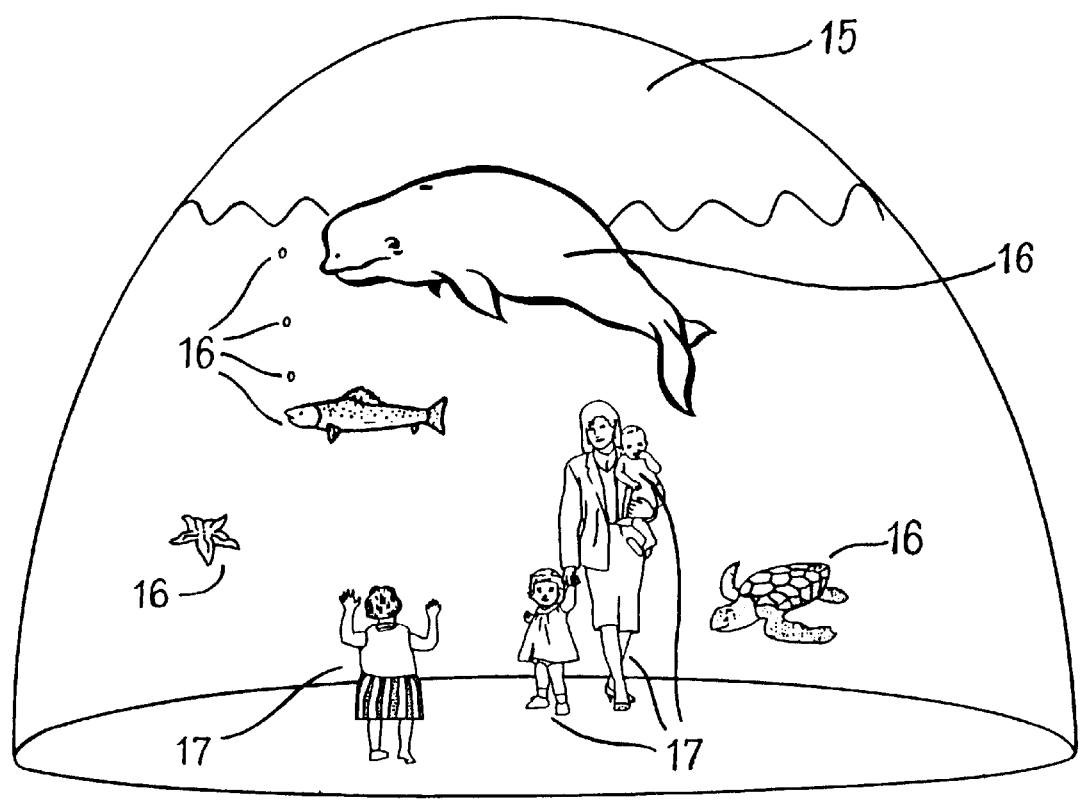
FIG. 1 shows an interactive theatre in use.

A preferred embodiment of the present invention is shown in FIG. 1. An interactive theatre 15 is built in a shape that facilitates projection of large images on its walls. The images can also be projected on the floor and the ceiling. The images are composed of actors 16 which can be anything: objects, humans, animals, plants, etc. A preferred shape for the implementation of the system is a dome. Such a dome consists in a room in the shape of a half sphere. The interior is accessible through a door (not shown) that is camouflaged in the decoration of the interior of the sphere. The interior space is of a size suitable for welcoming groups of visitors 17 of different sizes. It is understood that the dome could be replaced by a closed room or even an open area and that the projection of large images could be replaced by holographic displays or any type of presentation.

Figure 2:
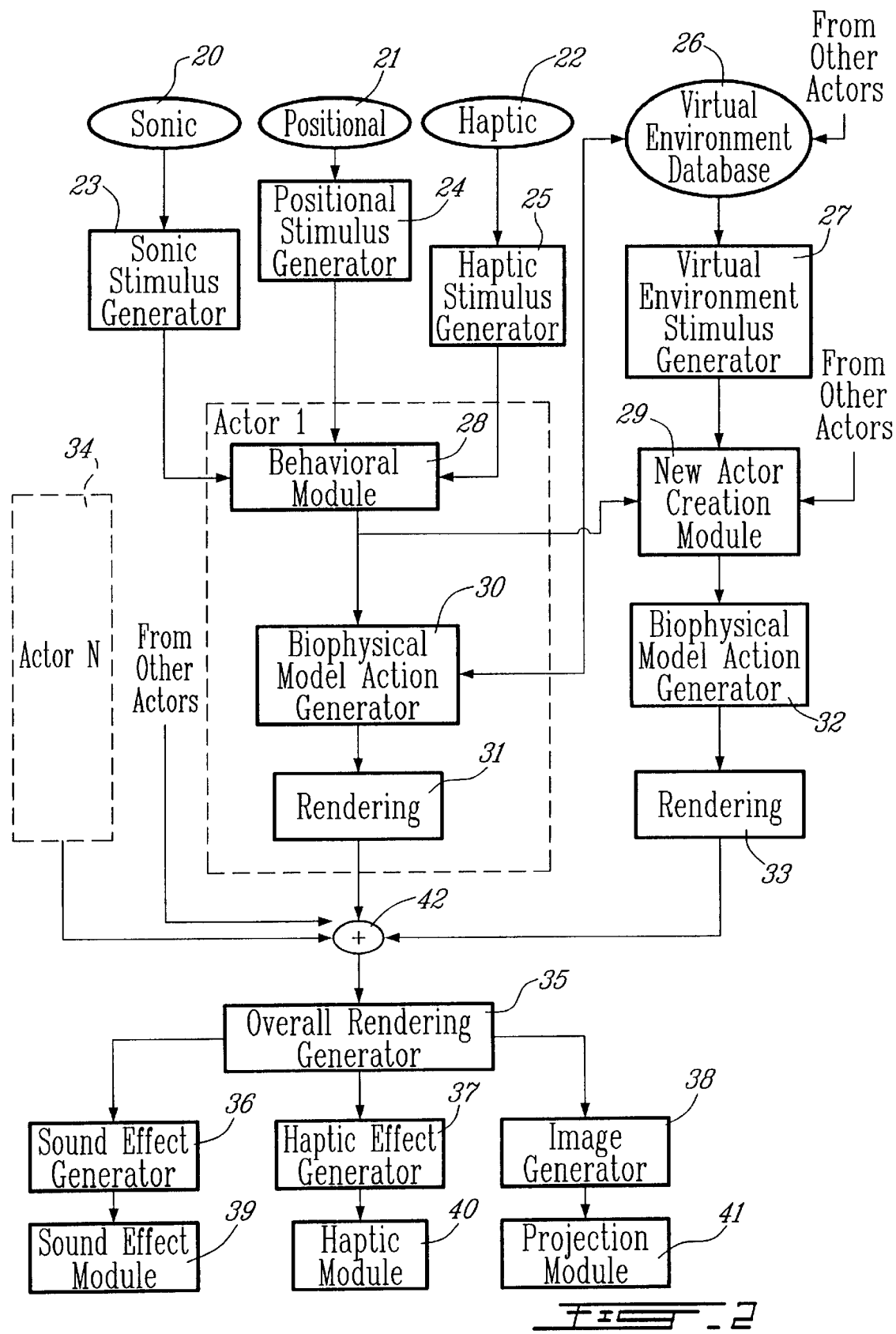
FIG. 2 is a block diagram of the modules of the system.

The system created in the preferred embodiment of the present invention is divided into modules to help implement all aspects of the invention. FIG. 2 illustrates the correlation between these modules.

Signals from the physical sensors come from different sources: sonic 20, positional 21 and haptic 22. Other sensors could be used such as body language sensors, group sensors, etc. The sensors 20, 21 and 22 in the theatre 15 each produce a stimulus. The Sonic Stimulus Generator 23, the Positional Stimulus Generator 24 and the Haptic Stimulus Generator 25 analyze and filter the raw signals from their respective sensors 20, 21 and 22 and produce a stimulus signal. Each of these stimulus signals is fed into the behavioral module 28 of every actor (in this case, actor #1). The behavioral module 28 determines, according to the behavioral characteristics of the actor, an action to undertake. This planned reaction of the actor is fed into the biophysical model action generator 30 which calculates the physical reaction of the actor with respect to its bodily limitations and characteristics. The planned reaction can comprise the creation of a new actor. The new actor that can be created can be bubbles, baby belugas, waves or anything that can react to other actor's behavior or to the environment. In that case, the reaction signal is fed to the new actor creation module 29 which plans a reaction for the new actor and feeds it to its biophysical model action generator 32.

The biophysical model action generator 30 of the actors sends a vector to the Rendering module 31. The New Actor creation module 29 also sends a vector to the biophysical model action generator 32 which sends a vector to the rendering module 33. An adder 42 combines all rendering vectors of all actors 34 and new actors. An overall rendering signal is sent to the Overall Rendering Generator 35 which calculates an overall rendering effect for all of the actors in the environment. A sound effect generator 36, an haptic effect generator 37 and an image generator 38 analyze the calculated overall rendering effect and calculate a specific effect. The sound effect module 39, the haptic module 40 and the projection module 41 generate what the visitor will hear, feel and see.

The biophysical model action generator 30 also sends a virtual environment update to the virtual environment database 26. This database comprises all data concerning all actors at any point in time. The Virtual Environment Stimulus Generator 27 reads information from this database 26 in order to calculate the occurrence of random events such as the apparition of new actors, for example. Once the Virtual Environment Stimulus Generator 27 decides that a new actor should be created, a signal is sent to the new actor creation module 29.

The biophysical model action generator 30 also reads information from the virtual environment database 26 in order to decide if an interaction with another actor is necessary. For example, a first actor could decide to go straight ahead for a distance of 2 meters but another actor is located straight ahead at 2 meters. Then, the biophysical model action generator 30, when calculating what trajectory, motion and aspect the first actor would have when traveling the 2 meter distance, would read from the virtual environment database 26 that another actor is present. The trajectory would be adapted accordingly.

Different sensors will be located throughout the theatre, enabling technicians to record real activity signals from the theatre. For example, sound waves will be recorded at different points in the dome. Other types of sensors can include cameras, microphones, optical detection using lasers, handheld devices that the visitors carry, tactile plates, sensors affixed to the body of the visitors, body language interpreters, etc. It does not matter which type of detection is done, as long as the visitors and their actions are detected. These measurements will give an idea of the distribution of the ambient noise and activity in the dome. When a first derivative of this signal will be calculated, the general movement of this ambient noise will be determined. A second derivative of this signal will give an indication of sudden noises and their position in the theatre. Also, these signals could be fed into speech recognition or phoneme recognition systems. The sensors used to measure the sound level could be, for example, directional microphones.

The position of the visitor will also be determined. Sensors located at a plurality of positions will detect at least one physical characteristic such as position for the visitors. The plurality of positions should be at least four positions in order to get an accurate position using the triangulation method. However, only three positions could be used. More positions would yield more accurate results. Also, the information on the visitor activity and position could be represented on a contour map for ease of analysis and processing. This position indication will enable other modules of the system to trace guides for the movements of the virtual actor. For example, a curious actor will go towards the visitor and a frightened actor will retreat far from the visitor. The first derivative of the position of the visitor will indicate the displacement of the visitor. The second derivative of the position will detect sudden movements of the visitors. These signals could also be fed to gestural language recognition software or other gestural signs recognition systems. The sensors used to capture the position of the visitor will comprise, for example, tactile sensors, sonar systems, infrared cameras, ultrasound detectors or other position determiners.

Other spatial data and their derivatives can also be used to determine stimuli on the actor. These signals, comprising logical sets of actions, could be decoded by the behavioral module and biophysical model action generator of the actor.

The behavioral module 28 will calculate, from the data collected at the user interface, the reaction of the actor. The actors will likely be virtual animals or virtual physical actors which have behaviors that are easier to simulate than those of humans. However, virtual plants, virtual humans and virtual extra-terrestrial beings could all be actors in such an interactive theatre. The calculation of the behavior of the actor will be done using their own factors. These factors will be, for example in the case of a marine animal: the age, hunger and thirst, tiredness, alertness, distance from stimulus, genetics and handicaps and other factors.

For example, the younger the animal, the sharper its reactions. It will be afraid more easily and will be curious more easily. An older animal will more likely be passive with respect to the stimuli of the visitors. An hungry animal will be more sensible to sudden noises and visual stimuli. An animal that is falling asleep will be more nervous with respect to sudden noises and movements but completely passive with respect to ambient noise and fixed position of the visitor. An alert animal, concentrated on the surveillance of a particular point in the environment will react promptly to all that concerns the point of interest and will react more slowly to other stimuli. The further the stimulus from the animal, the less impact it will have on its behavior. A blind animal will not react to visual stimuli. A deaf animal will not react to sound. An injured animal will be prompter in its reactions but less mobile.

An equation will be built that calculates the level of attractiveness (if the result is positive) or repulsion (if result is negative) of the animal towards the stimulus. This equation can be of the kind: (equation 1)

$$N=\Sigma(F_{i0}*S_i(t)+F_{i1}*S_i(t)/\delta t+F_{i2}*S_i(t)/\delta t^2))/d$$

Where:

N=extent of the speed vector (V)

$F_{in}$=Psychological factor i acting on the nth derivative of the stimulus

S=Magnitude of stimulus (sonic, visual, etc.)

d=Distance between the actor and the stimulus.

Figure 6:
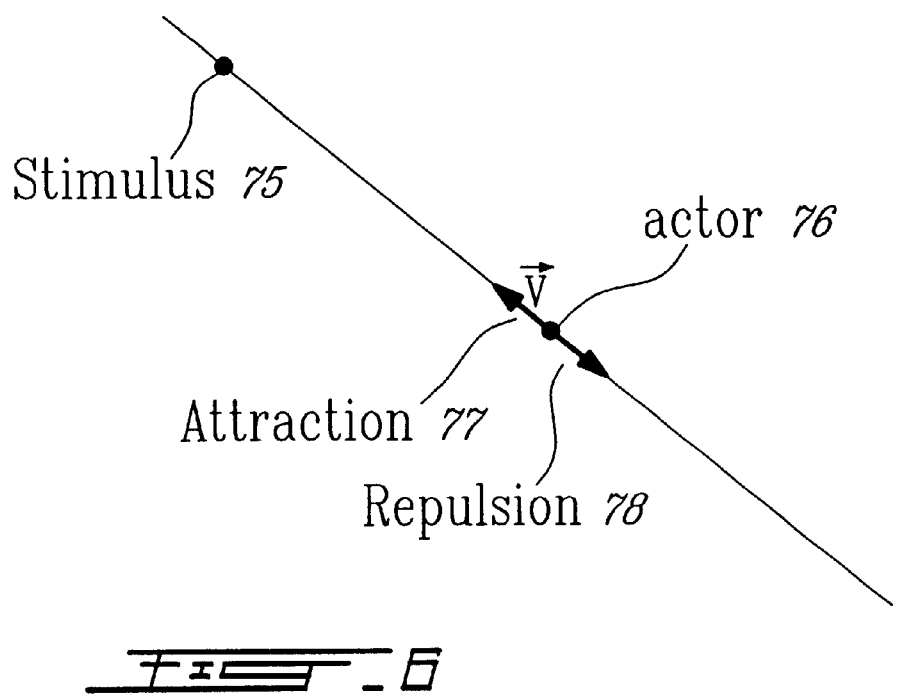
FIG. 6 is a representation of the direction of the velocity vector for the actor.

The orientation of the velocity vector for the actor will always be located on a straight line passing through the point from which the stimulus 75 is coming and the position of the actor 76. FIG. 6 shows this relation. The reaction can be attraction 77 or repulsion 78. Then, equation 1 can be re-written in a matrix format to yield the following Velocity vector: (equation 2)

$$V(x,y,z)=(\Sigma(|Ps-Pa||F|*|S|))/d^2$$

where

Ps=Position of stimulus Ps(x,y,z)

Pa=Position of the animal or actor Pa(x,y,z)

F=matrix of the effects of a psychological factor on the environmental factor and its first two derivatives F(d0, d1, d2)

S=values of the stimulus and its first two derivatives s(d0, d1, d2)

d=distance between the stimulus and the animal

The behavior module 28 will also calculate, in addition to the direction taken by the actor, a reaction composed of sounds or other types of reactions from the animal or the object, according, again, to the actor's own factors. This module will also be responsible for calculating the behavior of the actor in a "normal" mode, that is when the actor is not responding to any stimulus but doing its own activities. For example, for a marine animal, this would include playing or catching a small fish.

The actor has decision layers that coordinate its reactions. For the example of the beluga, the primary decisional layer, directly connected to the muscles, models the primary actions of the marine animal: swimming, direction, glance, eating habits, sound emissions and echolocation. This active layer synchronizes in time and space all the different muscles and tissues of the animal in order to model these primary actions in a realistic manner.

The secondary decisional layer activates and synchronizes the reactions of the primary layer, modeling typical behaviors of the animal: curiosity, hunger, fear, laziness, sociability. Contrary to the primary layer, the secondary layer is specific to each individual of each species. The reactions to the events of the environment are mapped by the personality or the age and experience of each animal of the group.

The tertiary layer is the one that analyzes the information coming from the senses: the eye and the ear. After an analysis of the sensorial signals, it activates the secondary layers and the muscles. For example, a noisy boat passing rapidly by could activate fear (secondary) and a glance (primary) as well as stopping all muscle movement (muscular).

The events perceived are of two kinds: the real stimuli from the interactive theatre and the simulated events, generated more or less randomly from a scenario predetermined. The mixture of these stimuli will nourish the nervous system of the animal, its behavior, and its displacements within the simulated environment.

Figure 3:
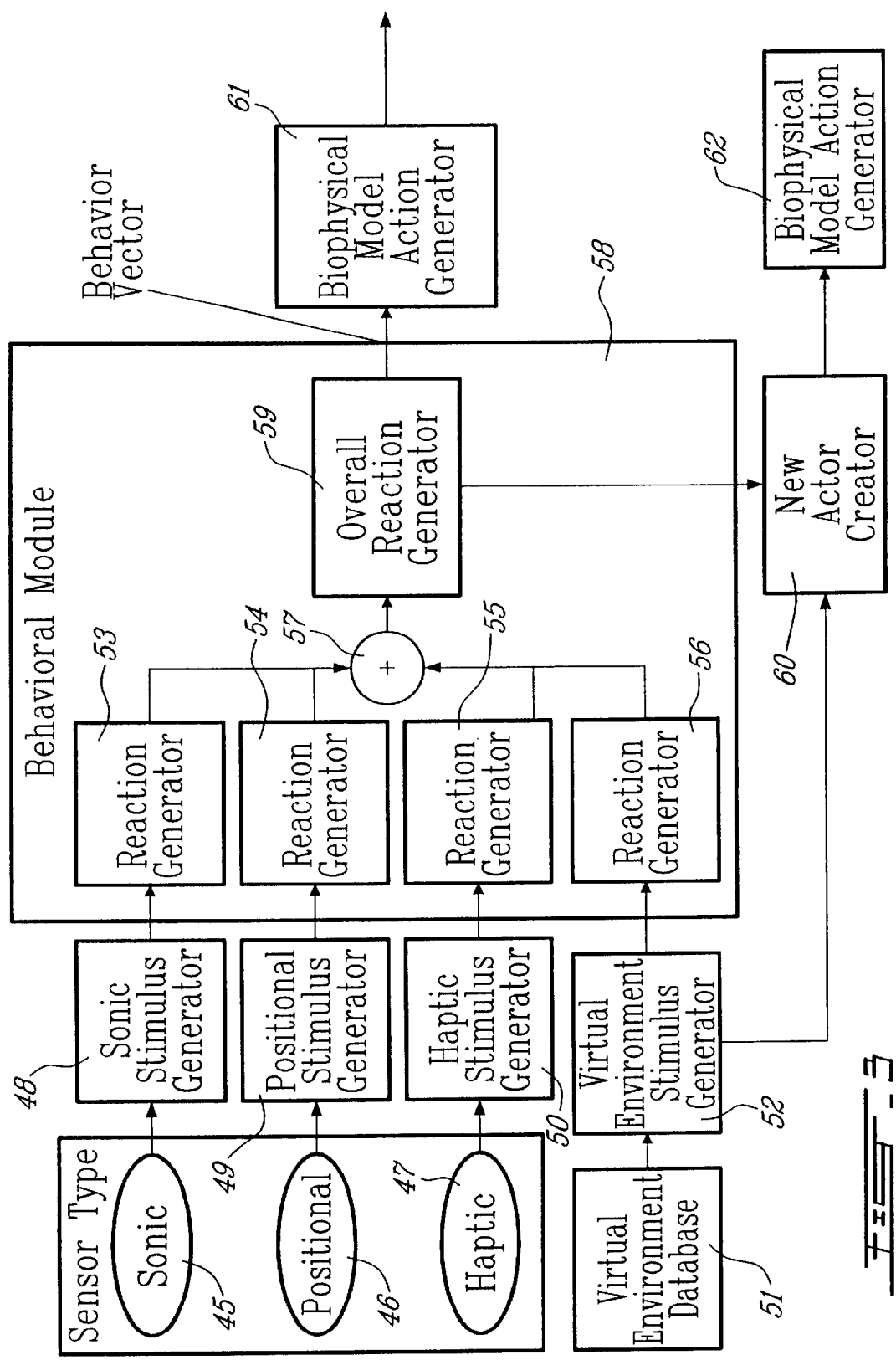
FIG. 3 is a block diagram of the details of the behavioral module.

The generation of the stimuli being sent to the Behavioral module linked to every actor can be schematized as shown in FIG. 3. FIG. 3 illustrates the processing done for each actor.

An event occurring in the dome or generated by the virtual environment module triggers different type of sensors 45, 46, 47. Each of these generates a stimulus which is computed by the stimuli generator 48, 49, 50. The actor can choose to react to it or not, using the reaction generator 53, 54, 55, according to its own psychological properties. If it chooses to react to it, the behavioral module 58 computes the reaction of the actor to this stimulus. All the reactions are then combined together 57 in an overall reaction by the overall reaction generator 59 and will be fed to the Biophysical Model action generator module 61.

A virtual environment database 51 keeps track, as explained earlier, of all activities in the dome. The virtual environment stimulus generator 52 computes random events and can create new actors. It can also generate a reaction using the reaction generator 56, which will be added 57 to the overall reaction generator 59. A new actor creator 60 uses the signal from the overall reaction generator 59 and the virtual environment stimulus generator 52 and decides on a reaction which is fed to the biophysical model action generator 62 of the new actor.

There are 2 main types of stimuli that can be treated in parallel by the system. They are: Sonic Stimuli and Visual Stimuli.

Once captured by the microphones present in the dome, the ambient noise and its first two derivatives will be transferred to the software module. The modules will take into account the following particularities in the calculation of the animal reaction:

Sound is omnidirectional. Therefore, a sonic stimulus will have an effect even if the animal attention is focused somewhere else.

A deaf actor will not be influenced by a sonic stimulus.

An actor that is sleeping can be woken up by a sudden sonic stimulus. As we have already seen, a sudden sonic stimulus is generated from the second derivative of the signal caught by a microphone or any other type of sonic sensor.

Once captured by the physical sensors for the position present in the dome, the position of the visitors and its first two derivatives will be transferred to the software module. This one will take into account the following particularities in the calculation of the animal reaction:

Visual stimuli are unidirectional. Therefore, if a visual stimulus is not in the field of vision of the actor, this one will not react to it.

A blind actor will not be influenced by a visual stimulus.

An animal that is sleeping will not be woken up by a sudden movement in the dome.

Figure 4:
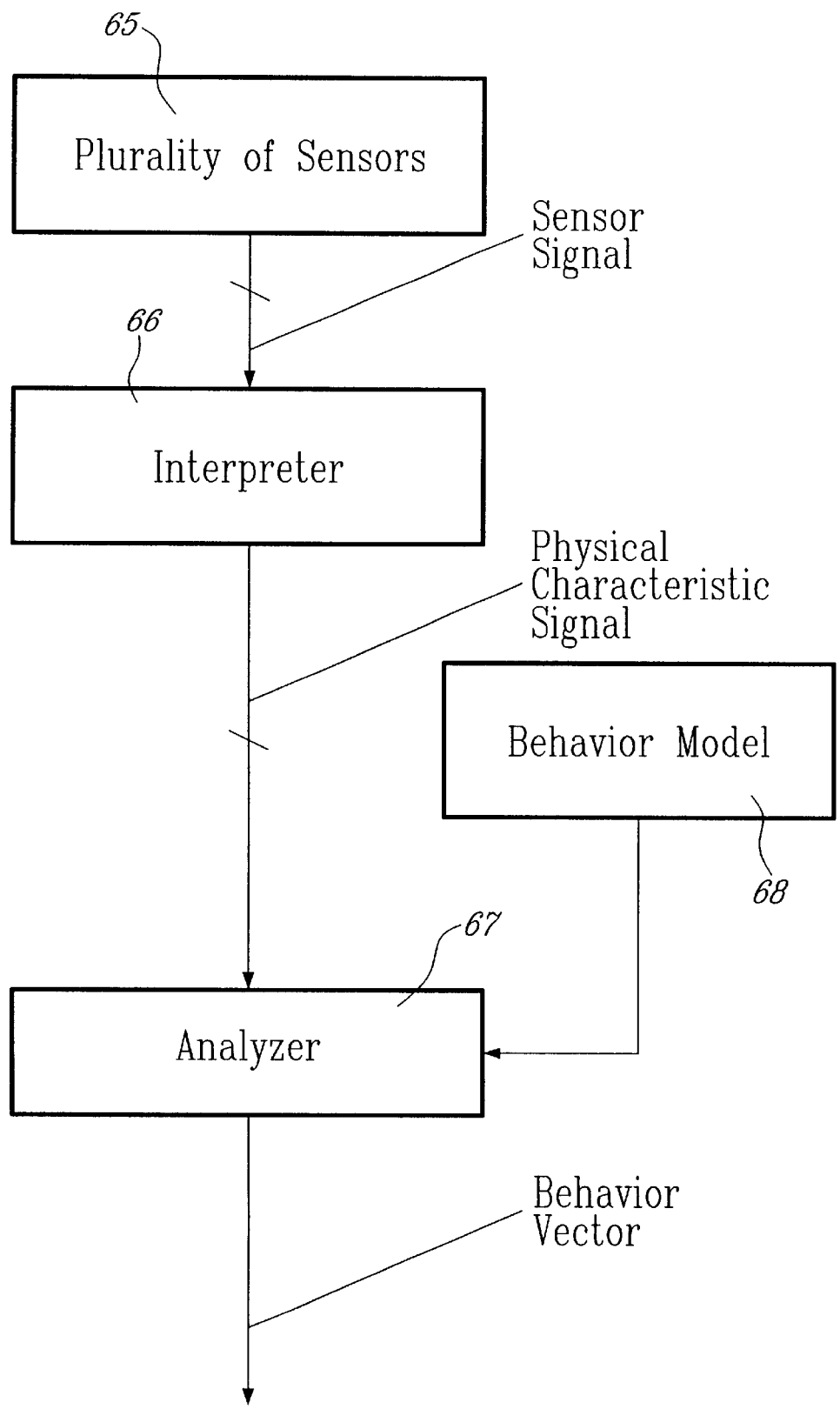
FIG. 4 is a flow chart of the general steps involved.

FIG. 4 is a general flow chart of the process. Sensors 65 are located in the dome. An interpreter 66 filters and analyzes the raw signals from these sensors a produces a physical characteristic signal which can be a bus or a single vector. The analyzer 67 reads from the behavioral module 68 and produces a rendering vector which will be used to display the environment.

Figure 5:
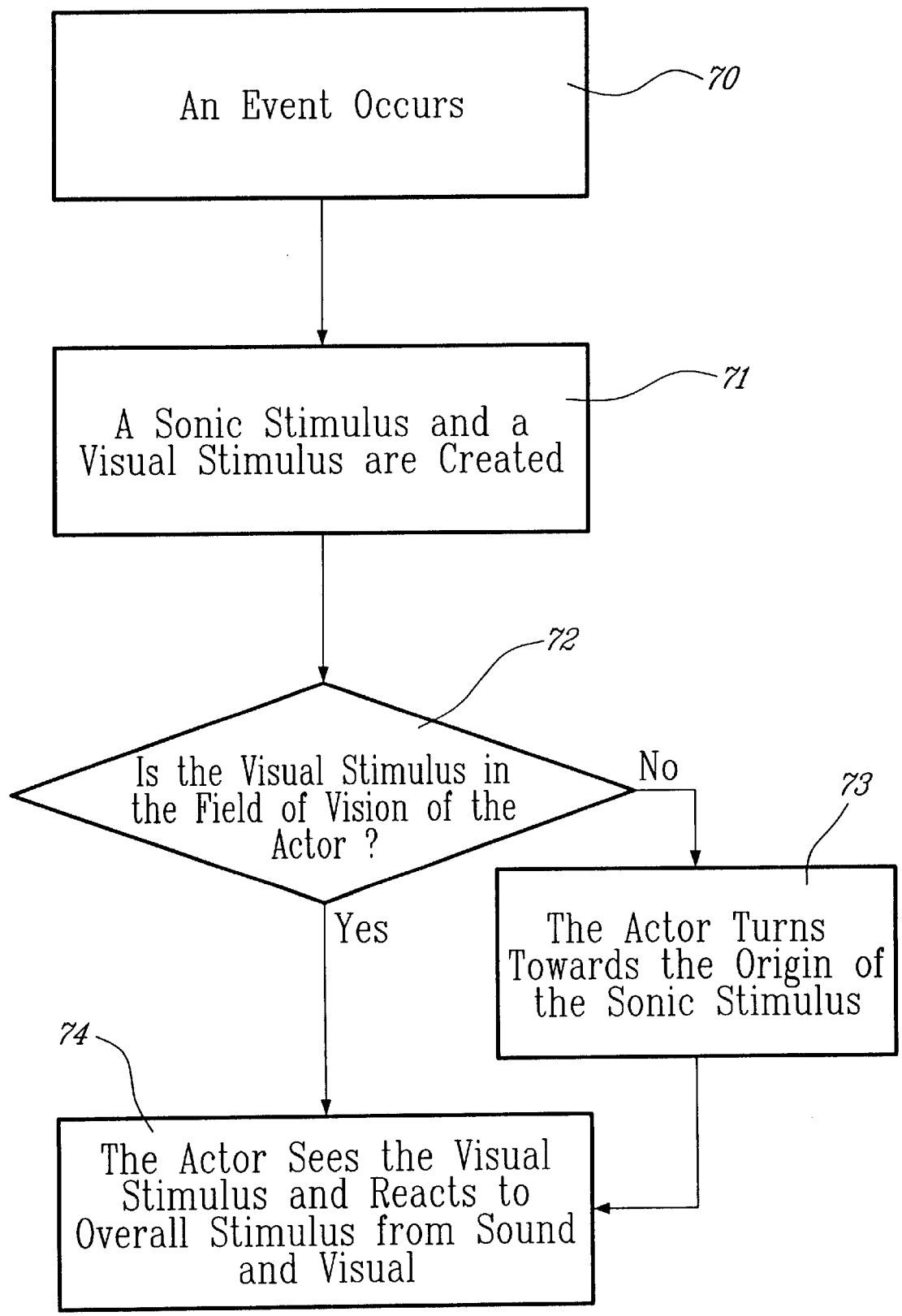
FIG. 5 is a flow chart of the detection of the stimuli.

FIG. 5 illustrates the following idea. Usually, an event that occurs 70 will produce, at the same time, a sonic and a visual stimulus 71. If the animal is not actually looking towards the position from which the stimulus is coming, it will, most of the time, respond to the sonic stimulus by turning its eyes towards the position from where the stimulus is coming 73 in a manner that will let the visual stimulus enter its field of vision and then, and only then, will react to the visual stimulus 74. If the animal is looking towards the event, he will react to the visual stimulus 74.

An actor will react to a stimulus depending on a series of factors which are influenced by its own psychology. For example, a fearful animal that sees a predator far away will tend to stop and watch its behavior as long as the animal is far enough and will escape if the stranger is getting closer or coming too rapidly towards the actor.

We have already seen that the equation computing the extent of the actor reaction is $$N=\Sigma(F_{i0}*S_i(t)+F_{i1}*S_i(t)/\delta t+F_{i2}*S_i(t)/\delta t^2))/d$$

where:

N=extent of the speed vector (V)

$F_{in}$=Psychological factor i acting on the nth derivative of the stimulus

S=Magnitude of stimulus (sonic, visual, etc.)

d=Distance between the actor and the stimulus.

The psychological factors $F_{in}$ are not constant but can in fact be modeled by a non-linear equation.

For example, the degree of fear of an animal can be represented by a nonlinear equation of the type:

if $d<T$ then $F_{i2}=1/d$ else $F_{i2}=0$ where:

T=threshold value over which the animal does not react.

d=distance between the actor and the stimulus.

The Biophysical model action generator 32 controls the physical aspect of the actor according to its body limitations. For example, it is known that no animal nor physical object of non-zero weight can move at an infinite angular velocity or linear velocity. This explains why the following data are necessary to the proper operation of the system. These data are, for example, a model of the surface of the actor, a model of the skeleton or structure of the actor, and a model of the muscular network (if any) of the actor. The tri-dimensional model of the surface of the actor is essential to the calculation of its appearance. The model of the surface can be composed of, for example, polygons. At each vertex of these polygons or at each critical point of this model, a vector representing the Young module will have to be associated. It will introduce a factor of ductility to the surface of the actor. This factor will enable the calculation of a deformation of the surface according to the resistance of the fluid through which it circulates as shown in equation 3:

$$D(x,y,z)=M(x,y,z)*V_r(x,y,z)*R_f$$

where

D(x,y,z)=distortion vector

M(x,y,z)=Young modules vector $V_r$(x,y,z)=relative velocity of the actor with respect to the ($V_{fluid}$(x,y,z)−$V_{actor}$(x,y,z))

$R_f$=Mechanical resistance of fluid.

A model of the skeleton or structure of the actor will determine its inertia. At each point of the frame (representing the joints) will be associated two vectors representing the limits of the moments: limits of the torsion clockwise and limits of the torsion counterclockwise, one value of the resistance in compression and one value of the resistance in traction.

The muscular model will model the power of the actor. At each muscular junction point of the actor will be associated two vectors representing the power of the actor in traction and in compression. This power will serve to the calculations of its acceleration and the speed limit that this actor can attain (with respect to the mechanical resistance of the fluid $R_f$ as discussed).

If we consider the actor to be a marine animal, more particularly a beluga, it is necessary to reproduce the physical aspect of it. Using the coordinates that define the shape of the animal, a spine is constructed. When connecting the bones of the fins, the neck and the jaw, we obtain the skeleton of the beluga. We can then envelop this structure with muscles, fibrous tissue and skin.

The muscles are in fact algorithms of sinusoidal animation positioned on the boned structure. These muscles are force points that activate the bones. In reaction, the relaxation points are countering the force points and add a softer appearance to the fibrous tissues. These tissues are also sinusoidal algorithms, which are parameterized to counter the muscles. The force points are located on the spine, the neck, the wrists of the fins, at the basis of the melon and along the lips. The relaxation points are located at the extremities of the tail and the fins.

The animation on the skeleton is transmitted to all of the structure by projecting the displacement of each of the vertebras to corresponding points on the skin of the animal. This skin is composed of textured images. The muscles are connected to a nervous system. The nervous system stretches from the senses to the muscles through a series of decision layers that will determine the behavior of the actor.

Also, the calculation of the position of the actor will be given as input to the behavior module and will be used as a supplementary virtual stimulus. With all these parameters in hand, the biophysical model action generator module will be able to, according to the data calculated, give the object rendering module the necessary data to display the scene.

Once the position and the torsion applied to the surface of the actor are modeled by the other modules, the object rendering module is responsible to display the actor and its environment. The object rendering can be visual, composed of sounds, haptic, environmental or else. The object rendering can be displayed through cathode screens, holographic systems, lasers or other forms of visual display technologies. The sounds effects can be rendered through speakers located in the theatre or other sound effect technology. The haptic effect can be felt, for example, through release mechanisms that vibrate, electromagnetic systems or speakers that vibrate at low frequencies. These systems can be installed inside the theatre or directly on the visitor. The environmental effect can be rendered through automation systems, atmospheric simulation systems, pressurization systems, humidifiers, ventilators, lighting, robots, etc.

The environment in which the actors will live will first be created in a laboratory. It will, once ready, welcome the image of the belugas constructed in real time. A 2D animation module will combine these two techniques during display. This combination of multiple layers: sea bottom, belugas, and suspended particles, is combined with a projection and display surrounding the field of view of the visitors.

In order to model the behavior of the beluga, a target in the environment is given to the beluga by the environment module. An algorithm typical to homing devices used in the military can be implemented for the beluga. The animal will then tend to get closer to its target, taking into account the constraints of flexibility of the body, of speed, displacement and which are parameterized using the weight, the agility and the age of the individual. If the target is reached or if the target moves, a new event is generated, in a random fashion and this new event will dictate a new target. There is always an inertia factor associated with the displacement of the animal and upper and lower limits on the acceleration of the animal.

Knowing its target orientation and speed, the actor's structure can be displaced. The physical limitations of the actor's structure, that is, the angular and linear position, speed and acceleration, will dictate an overall iteration of its attitude through time. The center of gravity of the actor moving along a path determined by its overall inertia and its body moving in a way to maintain this center of gravity along this path. For the neck, a start point on the first vertebra of the neck is calculated and the flexibility factor of the neck is used instead of that of the spine. Since belugas usually roll on themselves, a roll factor is added to the calculation of the segment which will make the beluga pivot on its longitudinal axis.

Figure 7:
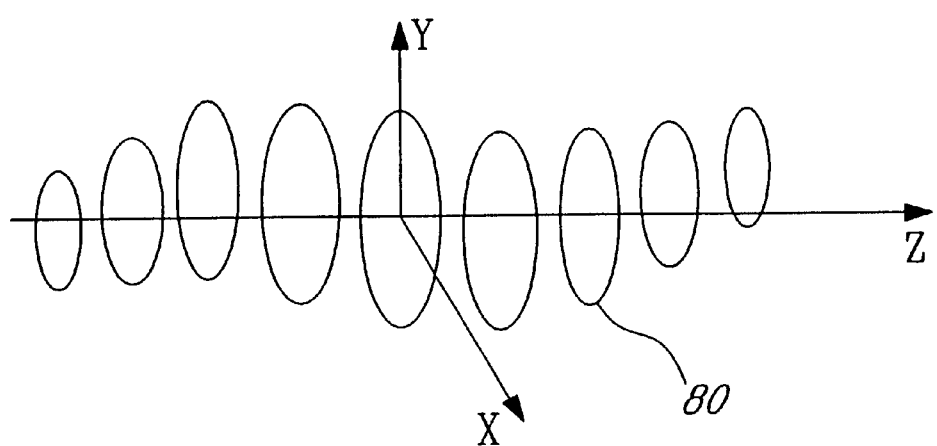
FIG. 7 illustrates the swim wave used to calculate the displacement of the beluga.

Swimming is modeled using a swim wave 80 as shown in FIG. 7. The wave has a sinusoidal shape that undergoes a displacement as a function of time, its amplitude being directly proportional to the velocity of the displacement of the animal and the position of the vertebra since the amplitude is less at the head than at the tail. Again, the amplitude of the wave will be proportional to the inertia of the body at this position along the spine, in a way to maintain a node in the wave at the center of gravity of the animal.

The generation of semi-random events is important to keep the virtual environment lively even when the visitors are less active. The passage of a school of fish, of a boat or of a killer whale as well as the marine currents are events that need to be simulated. The generator of random events will take into account the level of ambient noise, the cries, the displacement of a visitor nearby the screen and the quantity of people in the room. Using a pre-determined scenario, the generator will activate more or less randomly some events that render the environment lively. The events will influence the behavior of the animals and in the same manner, will activate the displacement and movements of the belugas. It will also activate the generation of sound waves and the activation of sea bottom animations.

In the case of belugas, generating sound waves is very important since these animals are really talkative. They emit different types of sounds: whistles, clicking and others. The modulation, the amplitude and the rhythm of each of these sounds enable him to communicate and express himself with his fellow belugas. In order to simulate in real time this language, a grammar can be constructed where the vocabulary of the beluga is inserted within grammar structures pre-defined. Some rules will manage the creation of sentences and phrases, simulating the monologues and dialogs of such species.

In order to simulate foggy water, a manipulation of the color and aspect (shade) of the actor is done. Equation 4

$$T_f = T_i * e^{-ad}$$

is used where:

$T_f$=final shade $T_i$=initial shade a=fog constant (as a increases, the opacity increases)

d=distance between the point and the visitor.

When trying to simulate the sun, a luminous source must be defined. The source that produces best results is an infinite source. The infinite luminous source simulates a global light for the whole environment (much like the sun, for example). This infinite source is then filtered with respect to the depth of the location of the actor, in such a way as to simulate the opacity of the ocean water, according to equation 5

$$E = e^{-ap}$$

where:

E=Luminous source a=water opacity constant (when a increases, the opacity increases)

p=depth of the illuminated point.

The present invention will be more readily understood by referring to the following example which is given to illustrate the invention rather than to limit its scope.

EXAMPLE I

An example of the implementation of the present invention in a preferred embodiment will now be described. The modules discussed are: physical module, virtual environment, spatialization module, behavioral module, attitudinal module, rendering module. As mentioned earlier, this system can be understood as a "man-in-the-loop" type of simulation systems. Revisiting FIG. 2 will give an overview of the various modules of the system that are involved at each iteration. FIG. 8 presents a class diagram of the entire system's software components to be described with respect to the modules.

The Physical Environment

The physical environment is made of series of electronic sensors allowing it to provide the behavioral module with data relative to the real-world activity in the room. FIG. 9 illustrates the processing on the data provided by a single electronic sensor 81.

Each of these sensors 81, which can be sonic sensors, physical sensors or any other type of sensors, will have to be linked to an electronic module 84 (in this case, an A/D converter) computing a numerical value which represents one of the raw data from the sensor 81, its first derivative 82 and its second derivative 83. The data provided to the computer must include the sensor ID 85 (in our example, "81") and three numerical values provided to the software components by the three states (raw, first derivative, second derivative) of the electronic component 81. These data will be read by the computer by polling, allowing the electronic module to work asynchronously. Also note that in a way to spatialize the data in three dimensions, at least four sensors of each type will have to be positioned judiciously in the room, in a way to obtain a minimal error in the triangulation calculation methods.

This data 85 will then be added to the data provided by the module simulating the virtual environment and decoded by the spatialization module.

The Virtual Environment

This module creates a simulation using, preferably, software, of the data provided electronically by the sensors of the physical module. Essentially, it will generate sensorial data coming from a specific point in space. This data will then be decoded by the spatial module.

The Spatial Module

At each iteration, this module receives the data relative to each sensor from the physical module. This data comprises: an ID, the sensor level data, its first derivative and its second derivative.

This module accesses a calibration table allowing it to associate a position and a type to the sensor ID received. In a preferred embodiment of the present invention, data represented in Table 1 can be used to build the calibration table:

TABLE 1

EXAMPLE OF A CALIBRATION TABLE

| Sensor | Type | X | Y | Z |
|---|---|---|---|---|
| A | Sonic | 4.356 | 7.923 | 8.382 |
| B | Sonic | 2.748 | 1.038 | 2.661 |
| C | Positional | 8.233 | 8.018 | 0.000 |

Therefore, the spatial module will be able to provide the behavioral module with the stimuli presented to the virtual entities. FIG. 10 illustrates a class diagram of the interface that allows the module to compute the stimuli in a preferred embodiment of the present invention.

SensorData 87

Essentially, this class includes the data needed for the generation of a stimulus by the class StimuliGenerator 89. Its pure virtual function getData( ) 88 will be re-definable in its derived classes, namely PhysicalSensorData 91 and VirtualSensorData 93.

PhysicalSensorData 91

This class includes a re-definition of the virtual method getData( ) 88. function can read the data provided by a specific type of electronic sensor.

VirtualSensorData 93

This class also includes a re-definition of the virtual method getData( ) 88. This function can simulate the acquisition of data provided by any sensor.

StimuliGenerator 89

This class is the core of the spatial module. Known by the feedback controller of the system (the class VirtualWorld 115), it collects, at a pre-established frequency, through a call to its public method calcStimuli( ) 90, the data relative to the sensors (via the classes defined above) and creates a linked list of stimuli, which will be returned to the calling function.

Stimulus 95

This container-class groups together the data relative to a particular stimuli.

The Behavioral Module

As mentioned, this software module computes, from the data provided by the user interface, the reaction of the virtual animal. This computation is made according to various entity-specific factors. The data relative to virtual entities will be defined in a file Entities.dat which will look as follows:

| Entity 1 | |
|---|---|
| Stimulus | Value |
| Stimulus | Value |
| Stimulus | Value |
| Entity 2 | |
| Stimulus | Value |
| Stimulus | Value |
| Stimulus | Value |
| Entity 3 | |
| Stimulus | Value |
| Stimulus | Value |
| Stimulus | Value |

Figure 11:
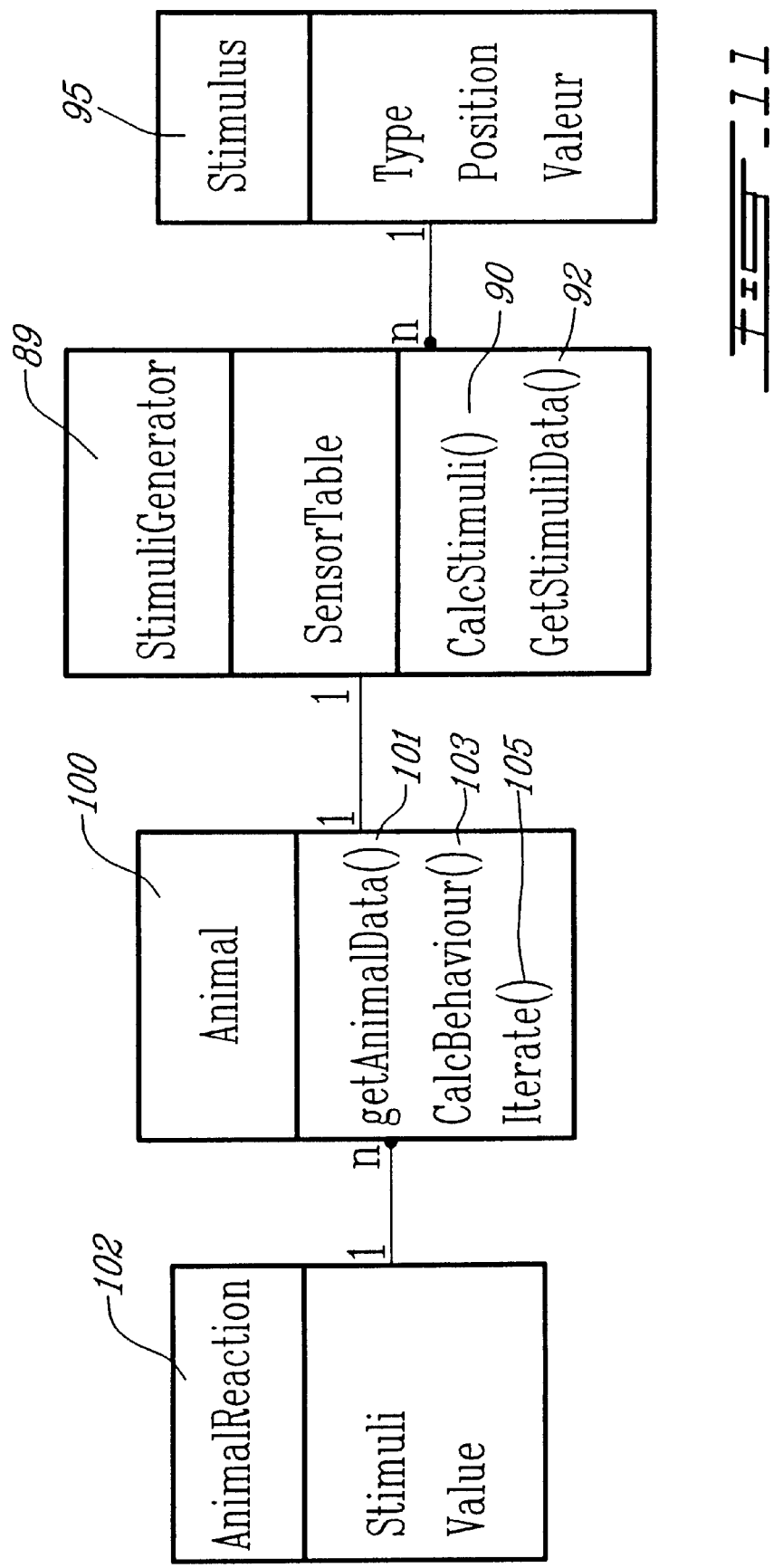
FIG. 11 is a class diagram for the behavioral module according to Example 1.

FIG. 11 illustrates a class diagram that models the behavioral module

Animal 100

This class will simulate the animal behavior by computing its velocity vector (see FIG. 6) according to the stimuli calculated by the spacial module and accessible to the system through the class StimuliGenerator 89. Animal's constructor method will receive the name of the associated configuration file as an argument and will call the method getAnimalData( ) 101 which will create a list of behavioral factors, kept in a linked list of instances of the class AnimalReaction 102. The method CalcBehavior( ) 103 will compute a velocity vector by associating the data collected by the instance of StimuliGenerator 89 (through a call to the method GetStimuliData( ) 92) to this list of instances using equation 2.

AnimalReaction 102

As just mentioned, this class will essentially be a container for the data defining the animal reaction towards a specific stimulus.

The Attitudinal Module

Figure 12:
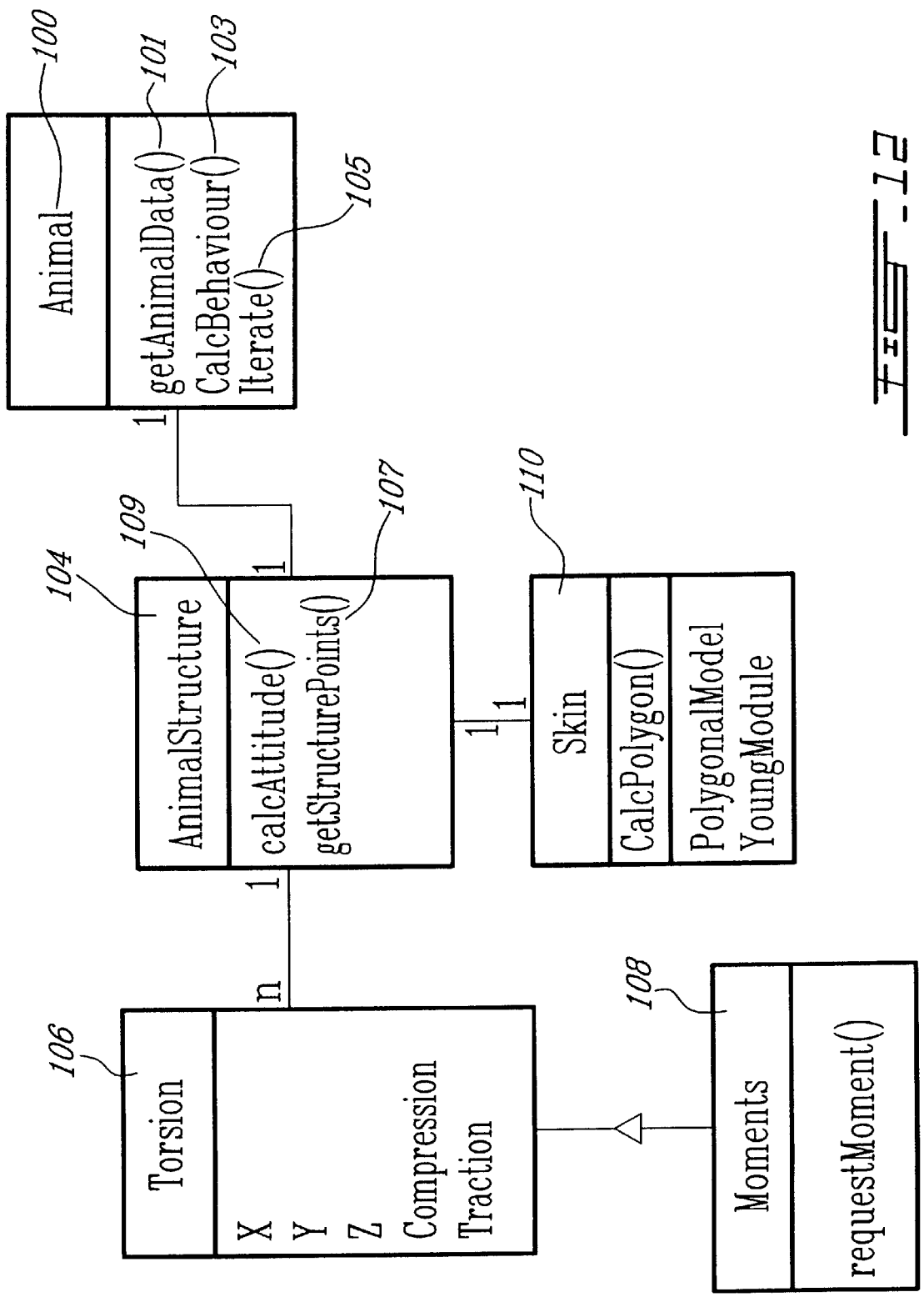
FIG. 12 is a class diagram for the attitudinal module according to Example 1.

As mentioned, no animal nor physical entity of non-zero weight can move at an infinite linear speed nor at an infinite angular speed. The attitudinal module is the one responsible to simulate the physical behavior of the animal according to its own physical constraints. FIG. 12 shows a class diagram that models the attitudinal module.

Animal 100

This class has already been defined in the behavioral module. Essentially, it is involved in the computation of the attitudinal module by calculating at each iteration the virtual entities' attitudes by using the velocity vector provided by the behavioral module through the method iterate( ) 105.

AnimalStructure 104

This class embeds the structural data of the animal and allows the calculation of its skeleton's location in space (using the function getStructurePoints( ) 107) to finally iterate the position of all the polygons defining its surface (using the function calcAttitude( ) 109).

Torsion 106

This container-class will be used to embed any three-dimensional torsion-related data.

Moments 108

Derived from class Torsion 106, this class will allow the system to associate a desired moment to a specific point on the animal structure. Note that this requested moment will be filtered by the optimal torsion data included in its base class (Torsion 106). This aims at iterating the real moment applied to the animal structure.

Skin 110

This class models the surface of the animal. Once the structure-related data is computed by the method Animal::getStructurePoints( ) 107, its surface-related data, embedded herein, will be used to compute all the polygons forming the animal surface through the method Animal::calcAttitude( ) 109.

The Rendering Module

Figure 13:
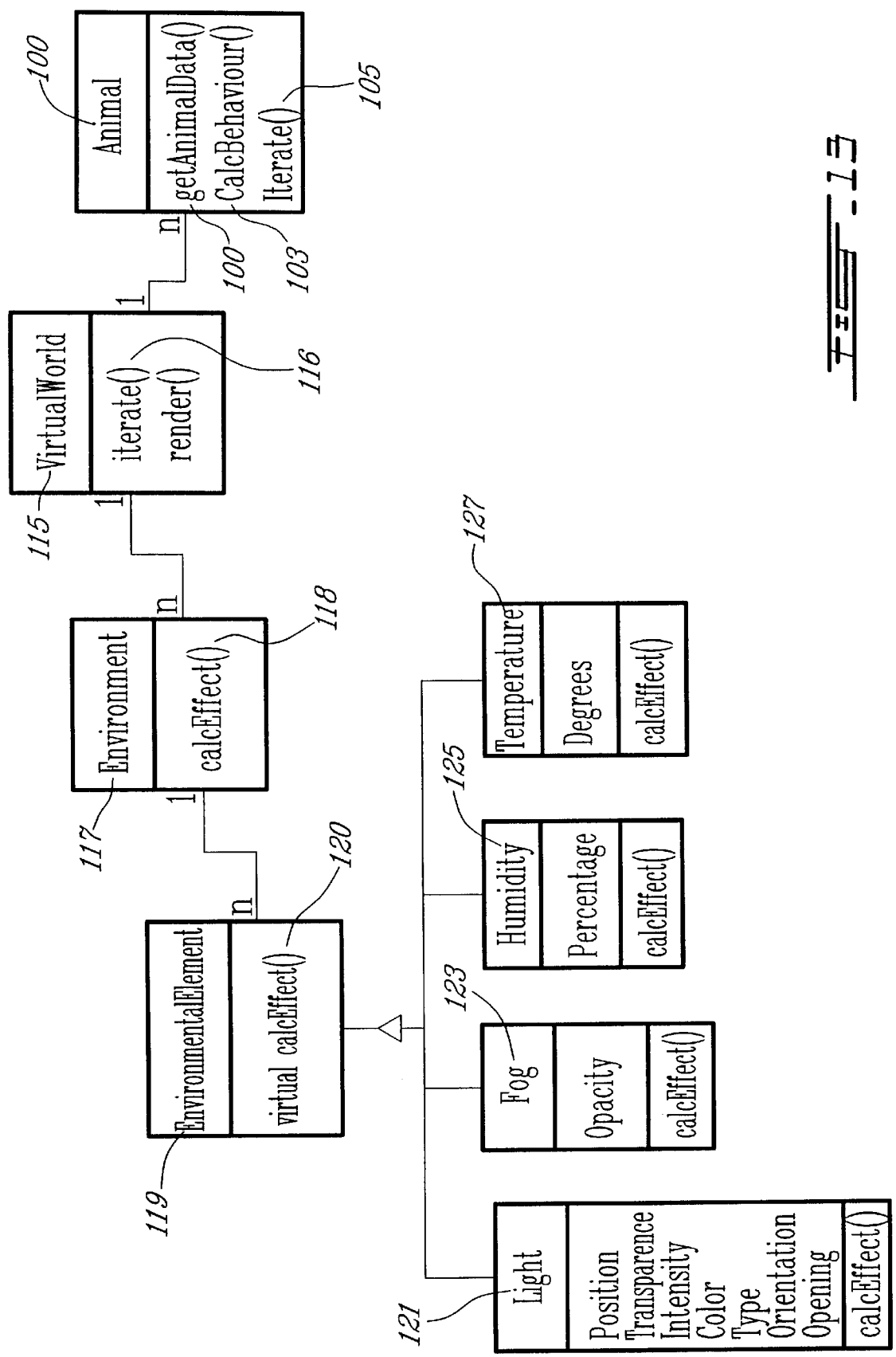
FIG. 13 is a class diagram for the rendering module according to Example 1.

The rendering module is responsible for the display of the virtual world, using a three-dimensional projection system or simply using a two-dimensional representation computed by means of a graphic library as OpenGL or OpenInventor, for instance. FIG. 13 is a class diagram that models the attitudinal module.

VirtualWorld 115

This class is the core class of the entire system. Its method iterate( ) 116 must be called at a predefined rate in a way to synchronize every module of the system. This method will first call the methods of the class Animal 100 which associates the stimuli and the behavioral data. It will then synchronize the rendering of physical entities and will add to the scenery the effects of the virtual environmental parameters computed by using instances of the Environment 117.

Environment 117

This class is responsible for the computation of environmental effects over the virtual scenery. It embeds a linked list of environmental (defined in instances of the class EnvironmentalElement 119), from which it will call successively the method calcEffect( ) 118.

EnvironmentalElement 119

This base class acts essentially as a container for a specific environmental effect. It contains only one pure virtual method, calcEffect( ) 118, which will be redefined in its derived class. Each of those derived class embeds a specific environmental effect which will influence the final rendering. For example, we defined the classes Light 121, embedding the effect of a generic light source, Fog 123, simulating the effect of a fog, Humidity 125 and Temperature 127, which, obviously, are encapsulating namely the effect of humidity and temperature.

The calculation of the actor's reaction is made by associating its phychological properties with the stimuli present in the simulation. Those stimuli can be provided by the virtual or the physical world and computed by Class StimuliGenerator. Here is an example of how this calculation is performed.

The following table represents an example of the reaction models of an animal according to its psychological factors:

Where:

S=The magnitude of the stimulus (between 0 (none) and 1 (maximal value))

d=distance between the actor and the stimulus v=speed projected on the direction vector of the actor (positive towards the actor)

a=acceleration projected on the direction vector of the actor (positive towards the actor)

The following algorithm explains the logic followed for the calculation of the actor's direction vector:

Initialize the actor's overall reaction to 0

For every stimuli present in the dome

If (the stimuli is visual and is located in the actor's field of view) or (the stimuli is a sonic one)

For every psychological factor associated by the actor
Add the actor's reaction towards this stimuli to the overall reaction Let us assume that the current stimuli present are:

A fish of interest magnitude of 0.4 passing at position (10,10,10), at a constant speed of (1,0,0)

The ambient sound has a magnitude of 0.2 and its center of gravity is located at (0,0,0)

The first derivative of this sound has a magnitude of 0.1

A sudden sound is triggered at position (1,1,1) with a magnitude of 0.7

The actor is located at position (5,5,5) looking in the direction (0,10,10) and has the psychological values:

Hunger: 0.2

Sleepiness: 0.5

Nervousness: 0.3

Reaction ID 1

Fish passing at a distance of 8,6 m (being less than 10 and the fish being in the field of vision of the actor, it will react):

$$\text{Reaction} = \text{Hunger}*\text{Interest magnitude}/(\text{distance}-10) = -0.2*0.41(-1.4) = 0.057 \text{ in direction } (10,10,10)-(5,5,5) = (0.385, 0.385, 0.385)$$

Reaction ID 2

The magnitude of the speed (1) of the fish being less than 20, the actor will not react.

Reaction ID 3

The magnitude of the acceleration (0) of the fish being less than 2, the actor will not react.

TABLE 2

Example of Reaction Models for an Actor

| ID | Psychological factor | Stimuli | Type | Deriv. | Condition | Equation |
|---|---|---|---|---|---|---|
| 1 | Hunger | Fish passing | Visual | 0 | d < 10 | $-S/(d-10)$ |
| 2 | Hunger | Fish passing | Visual | 1 | v < 20 | $S/(v-20)^2$ |
| 3 | Hunger | Fish passing | Visual | 2 | a < 2 | $(0.5*S)/(a-2)^2$ |
| 4 | Sleepiness | Fish passing | Visual | 0 | d < 50 | $-S/(d-50)$ |
| 5 | Sleepiness | Fish passing | Visual | 1 | d < 50 | $-S/(d-50)$ |
| 6 | Sleepiness | Fish passing | Visual | 2 | 0 | 0 |
| 7 | Nervousness | Noise | Sonic | 0 | none | 0 |
| 8 | Nervousness | Noise | Sonic | 1 | none | $S/d$ |
| 9 | Nervousness | Noise | Sonic | 2 | none | $S^2/d$ |

Reaction ID 4

The distance being less than 50 m and the fish being in the field of vision of the actor, it will react Reaction=−Sleepiness*Interest magnitude/(distance−50)=−0.5*0.4/(−41.4)=8.28 in direction (10,10,10)−(5,5,5)=(2.02, 2.02, 2.02)

Reaction ID 5

The distance being less than 50 m and the fish being in the field of vision of the actor, it will react Reaction=−Sleepiness*Interest magnitude/(distance−50)=−0.5*0.4/(−41.4)=8.28 in direction (10,10,10)−(5,5,5)=(2.02, 2.02, 2.02)

Reaction ID 6

0, by definition

Reaction ID 7

By definition, the actor is not reacting to the background noise.

Reaction ID 8

The magnitude of the first derivative of the sound is 0.1. The distance between the actor and the center of gravity of the sound is $sqrt(5^3)=11.2$ Thus:

Reaction=Nervousness*Magnitude of stimulus/distance=0.3*0.1/11.2=0.003 in direction (0,0,0)−(5,5,5)=(−0.145, −0.145, −0.145)

Reaction ID 9

The magnitude of the second derivative (sudden sound) of the sonic stimulus is 0.7. The distance between the actor and the center of gravity of the sound is $sqrt(4^3)=8$ Thus:

Reaction=Nervousness*(Magnitude of stimulus $)^2$/distance=−0.3*($0.7^2$)/8=−0,018 in direction (1,1,1)−(5,5,5)=(−0.26, −0.26, −0.26)

Therefore, the attraction vector assigned to the actor will be the summation of all the reactions computed:

| x | y | z |
|---|---|---|
| 0.385 | 0.385 | 0.385 |
| 2.02 | 2.02 | 2.02 |
| 2.02 | 2.02 | 2.02 |
| −0.145 | −0.145 | −0.145 |
| −0.26 | −0.26 | −0.26 |

In this example, the overall reaction would be (4.02x+4.02y+4.02z) or 6.76 in direction (1,1,1).

While the invention has been described with particular reference to the illustrated embodiment in example 1, it will be understood that numerous modifications thereto will appear to those skilled in the art. Accordingly, the above description and accompanying drawings should be taken as illustrative of the invention and not in a limiting sense.

The preferred embodiment has been shown to pertain to belugas in a virtual sea bottom. However, other types of environments and actors can be used without changing major aspects of the invention. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A method for generating a behavior vector for a virtual actor in an interactive theatre by interpreting stimuli from visitors, the method comprising:
    providing a plurality of sensors detecting and sensing at least one physical characteristic at a plurality of positions within a theatre area within which a number of visitors are free to move about, said sensors generating sensor signals;
    interpreting said sensor signals to provide at least one physical characteristic signal including position information, wherein said physical characteristic signal provides information on visitor activity and location within said theater area;
    providing a behavior model for at least one virtual actor;
    analyzing said at least one physical characteristic signal, a change over time of said physical characteristic signal and said behavior model for said at least one virtual actor to generate a behavior vector of said at least one virtual actor using said position information and said at least one physical characteristic signal, said behavior vector being generated in real-time;
    whereby a virtual actor reacts and interacts, in real-time, with visitors depending on the visitors' actions and evolution of said actions.

2. A method as claimed in claim 1, wherein said at least one physical characteristic is one of position, sound and movement.

3. A method as claimed in claim 1, wherein said plurality of positions is at least four positions.

4. A method as claimed in claim 1, wherein said information on visitor activity and location is represented by a contour map of said interactive theatre.

5. A method as claimed in claim 1, wherein said sensors are at least one of motion detectors, tactile plates, microphones, cameras, body language detectors.

6. A method as claimed in claim 1, wherein said virtual actor is a virtual beluga.

7. A method as claimed in claim 1, further comprising a step of providing a virtual environment database including information on all actors in said interactive theater.

8. A method as claimed in claim 7, further comprising a step of providing a virtual environment stimulus generator, wherein said virtual environment stimulus generator analyzes said virtual environment database and generates a virtual environment stimulus.

9. A method as claimed in claim 8, wherein said virtual environment stimulus is a new actor creation signal.

10. A method as claimed in claim 9, further comprising a step of providing a new actor creation module, wherein said module creates a new actor in said interactive theater using said at least one physical characteristic signal, said behavior model and said position information.

11. A method as claimed in claim 8, wherein said virtual environment stimulus is added to said at least one physical characteristic signal.

12. A method as claimed in claim 11, wherein said behavior vector is one of a repulsion vector or an attraction vector.

13. A method as claimed in claim 12, wherein said generating a behavior vector comprises adding a reaction for each physical characteristic signal, using said behavior model and said position information to an overall reaction to generate a behavior vector.

14. A method as claimed in claim 13, wherein said behavior model comprises, for each psychological factor, a type of stimuli to which it responds, an order of the derivative of said physical characteristic signal, a condition and a reaction equation.

15. A method as claimed in claim 12, wherein each physical characteristic signal of a similar type is summed into a physical signal for said type and wherein a reaction for said physical signal for said type is calculated, using said behavior model and said position information to an overall reaction to generate a behavior vector.

16. A method as claimed in claim 12, wherein said behavior vector is calculated using $$N=\Sigma(F_{i0}*S_i(t)+F_{i1}\cdot S_i(t)/\delta t+F_{i2}*S_i(t)/\delta t^2))/d$$

where:

N=extent of the speed vector (V)

$F_{in}$=Psychological factor i acting on the nth derivative of the stimulus

S=Stimulus (Sonic, visual, etc.)

d=Distance between the actor and the stimulus.

17. A method as claimed in claim 1, wherein said visitor can be an adult, a child or an animal.

18. A method as claimed in claim 1, wherein said behavior model comprises, for each psychological factor, a list of parameters comprising a type of stimuli to which it responds, an order of the derivative of said physical characteristic signal, a condition and a reaction eqauation and wherein said behavior vector is first calculated for each physical characteristic signal and then summed to generate an overall behavior vector.

19. A method as claimed in claim 18, wherein said behavior model comprises psychological factors, wherein said psychological factors are at least one of age factor, hunger, thirst, sleepiness, attention span and disability and wherein said list of parameters for the psychological factor of hunger is

| Stimuli | Stimuli Type | Derivative Order | Condition | Reaction Equation |
| --- | --- | --- | --- | --- |
| Fish passing | Visual | 0 | d < 10 | −S/(d − 10) |
| Fish passing | Visual | 1 | v < 20 | S/(v − 20)$^2$ |
| Fish passing | Visual | 2 | a < 2 | (0.5*S)/(a − 2)$^2$ |

20. A method as claimed in claim 19, wherein said behavior model comprises data concerning a current state for at least one psychological factor.

21. A method as claimed in claim 20, wherein said current state for hunger is 0.5 and wherein said reaction equation for hunger is Reaction=Hunger*Interest magnitude/(distance−10).

22. A method as claimed in claim 1, wherein said behavior model comprises psychological factors and whrein said psychological factors are at least one of age factor, hunger, thirst, sleepiness, attention span and disability.

* * * * *

UNITED STATES PATENT AND TRADEMARK OFFICE
CERTIFICATE OF CORRECTION

| | | |
|---|---|---|
| PATENT NO. | : 6,507,353 B1 | |
| APPLICATION NO. | : 09/459049 | |
| DATED | : January 14, 2003 | |
| INVENTOR(S) | : Godot Huard and Philippe Fortier | |

It is certified that error appears in the above-identified patent and that said Letters Patent is hereby corrected as shown below:

In the drawings, sheet 2, Fig. 2, is corrected as follows:
the text label "Rendering" in the boxes numbered 31 and 33 is changed to -- Rendering module --;
an arrow is added, having its arrow foot attached to virtual Environment Stimulus Generator 27, and having its arrow head attached to the box identified as Behavioral Module 28.

In the drawings, sheet 4, Fig. 4, is corrected as follows:
the text "Behavior Model" in box 68 is changed to -- Behavioral Module --;
the text "Behavior Vector" is changed to "Rendering Vector".

In the drawings, sheet 7, Fig. 8; sheet 8, Fig. 10; and sheet 9, Fig. 11, the text "Valeur" in the box in each of Figs. 8, 10, and 11 labeled 95, is changed to -- Value --.

In the Specification

Column 2, line 28, change "information, wherein said physical characteristic signal" to -- information, wherein said at least one physical characteristic signal --;

Column 2, lines 46-47, change "FIG. 3 is a block diagram of the details of the behavioral module;" to -- FIG. 3 is a block diagram including the details of the behavioral module of Fig. 2 --.

Column 3, line 33, change "the actor, an action to undertake." to -- the actor, a reaction to undertake. --.

Column 5, line 20, change:
"$N=\Sigma(F_{i0} * S_i(t) + F_{i1} * S_i(t)/\delta t + F_{i2} * S_i(t)/\delta t^2))/d$"
to
-- $N=\Sigma(F_{i0} * S_i(t) + F_{i1} * S_i(t)/\delta t + F_{i2} * S_i(t)/\delta t^2)/d$ --.

Column 6, line 25, change "stimuli generator" to -- stimuli generators --;

Column 6, line 26, change "reaction generator" to -- reaction generators --.

Column 7, lines 5-8, change "An interpreter 66 filters and analyzes the raw signals from these sensors a produces a physical characteristic signal which can be a bus or a single vector." to -- An interpreter 66 filters and analyzes the raw signals from these sensors and produces a physical characteristic signal, which can be a bus or a single vector. --.

Signed and Sealed this
Eighteenth Day of June, 2013

Teresa Stanek Rea
*Acting Director of the United States Patent and Trademark Office*

Column 7, line 30, change:

"$N=\Sigma(F_{i0} * S_i(t) + F_{i1} * S_i(t)/\delta t + F_{i2} * S_i(t)/\delta t^2))/d$"

to

-- $N=\Sigma(F_{i0} * S_i(t) + F_{i1} * S_i(t)/\delta t + F_{i2} * S_i(t)/\delta t^2)/d$ --.

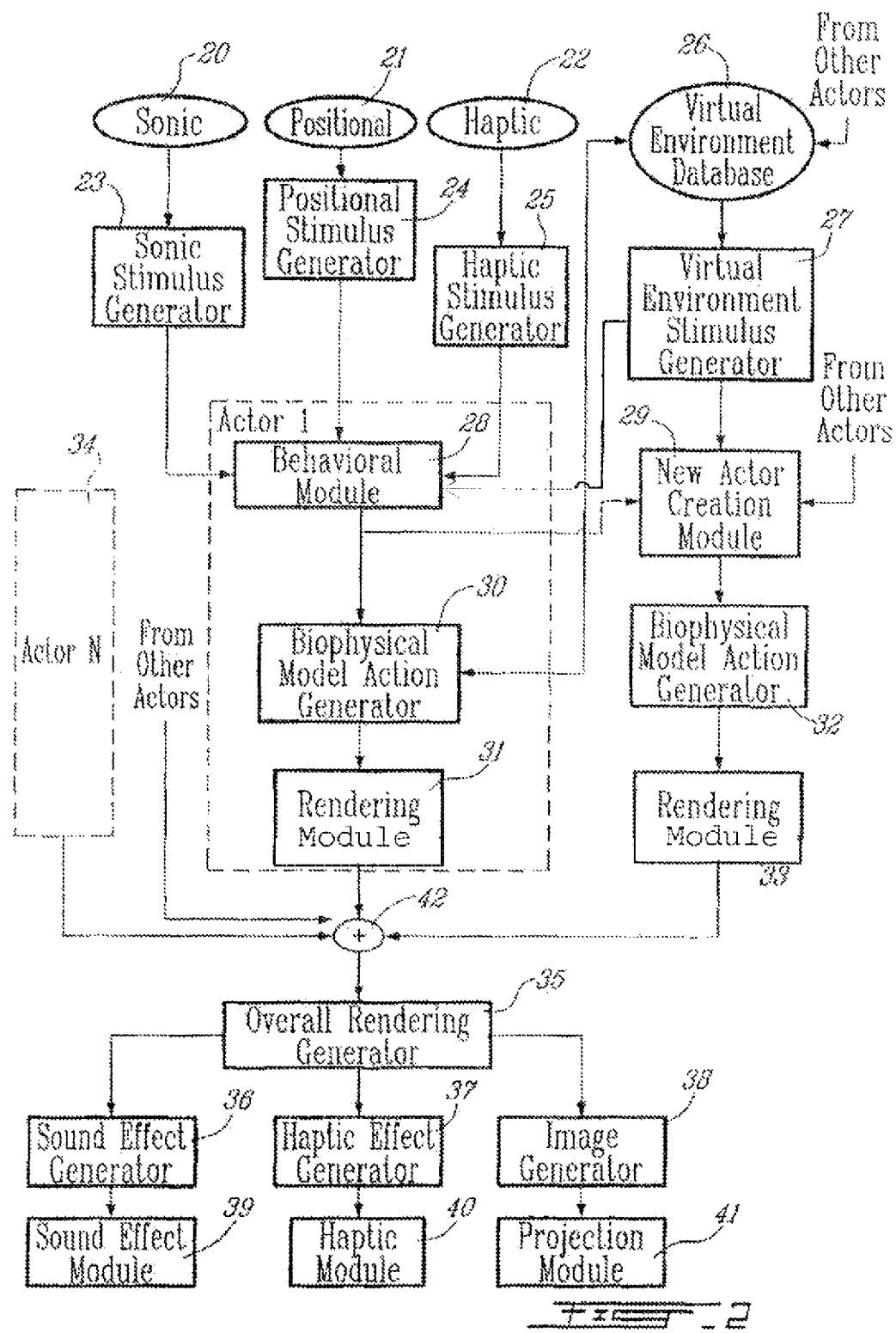

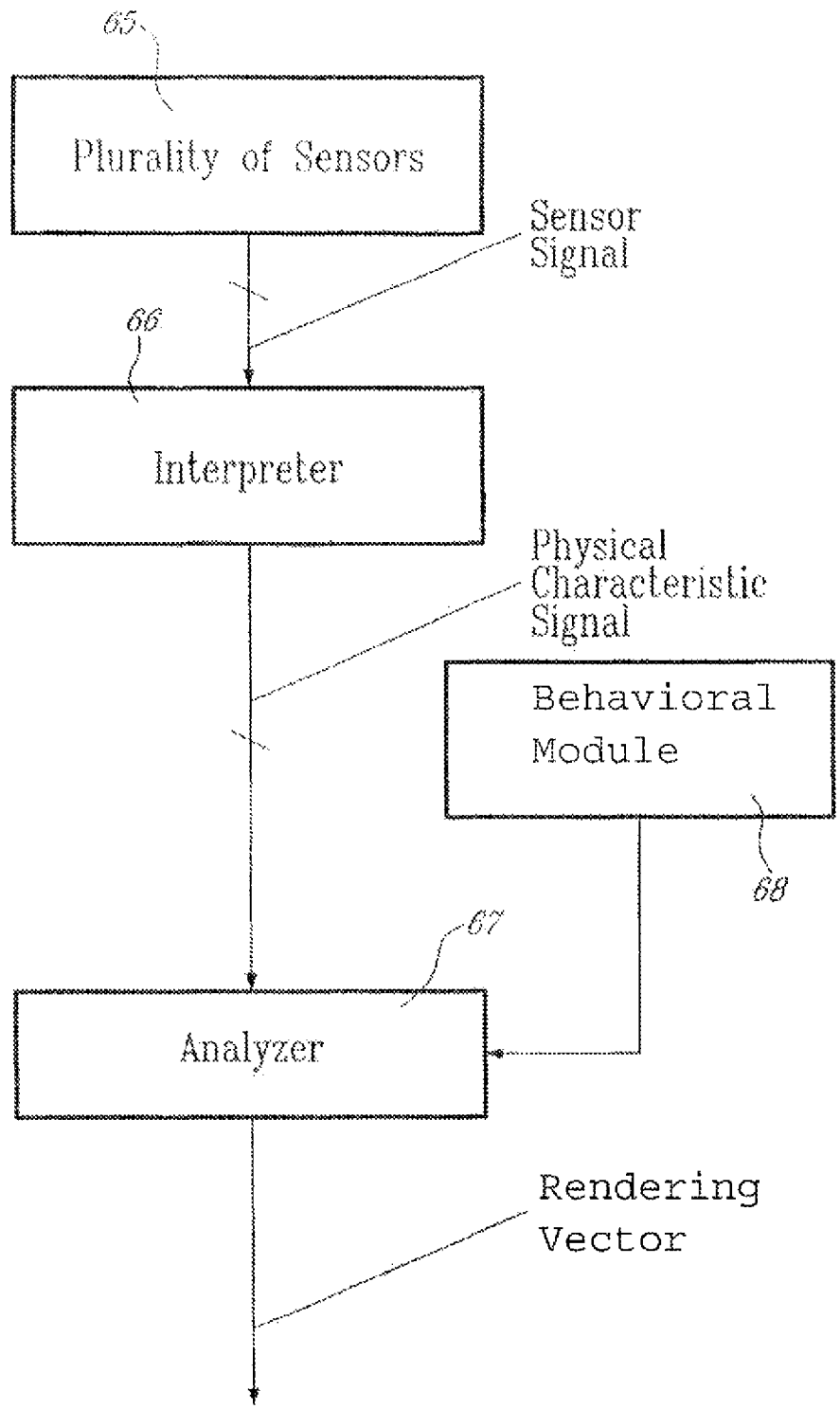

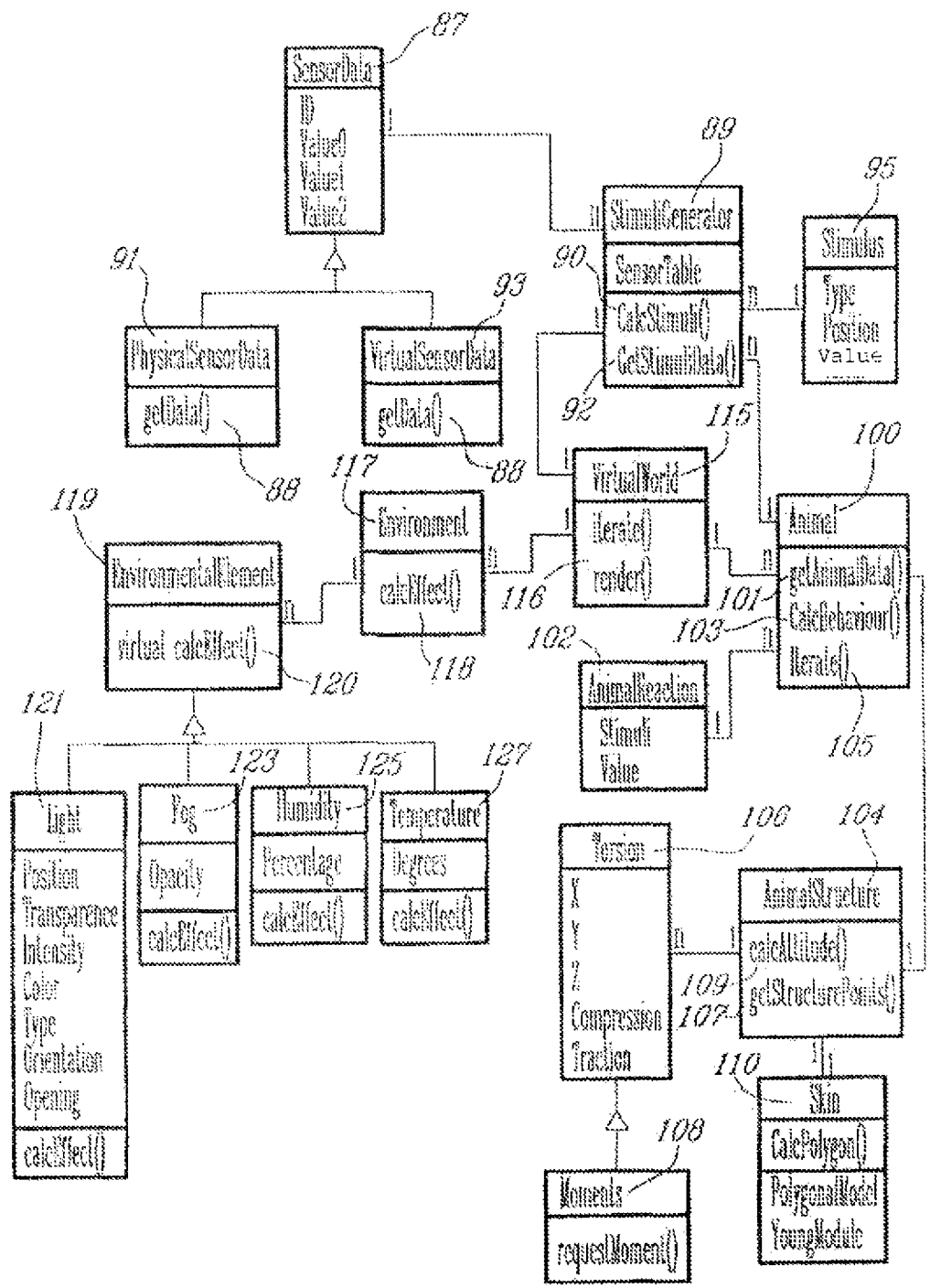

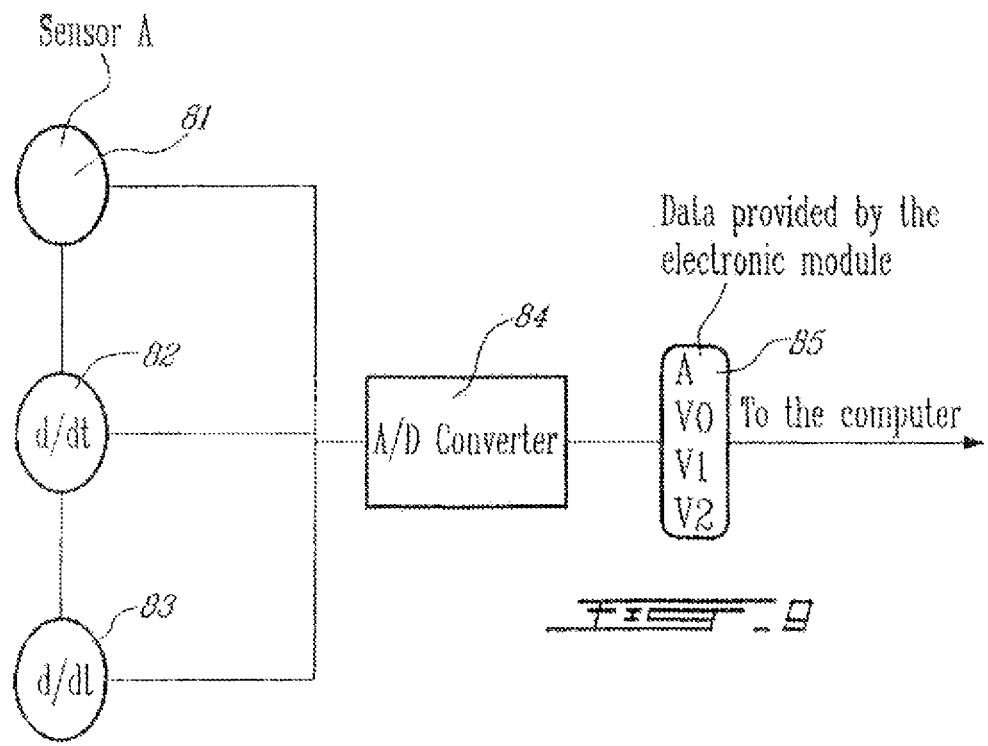
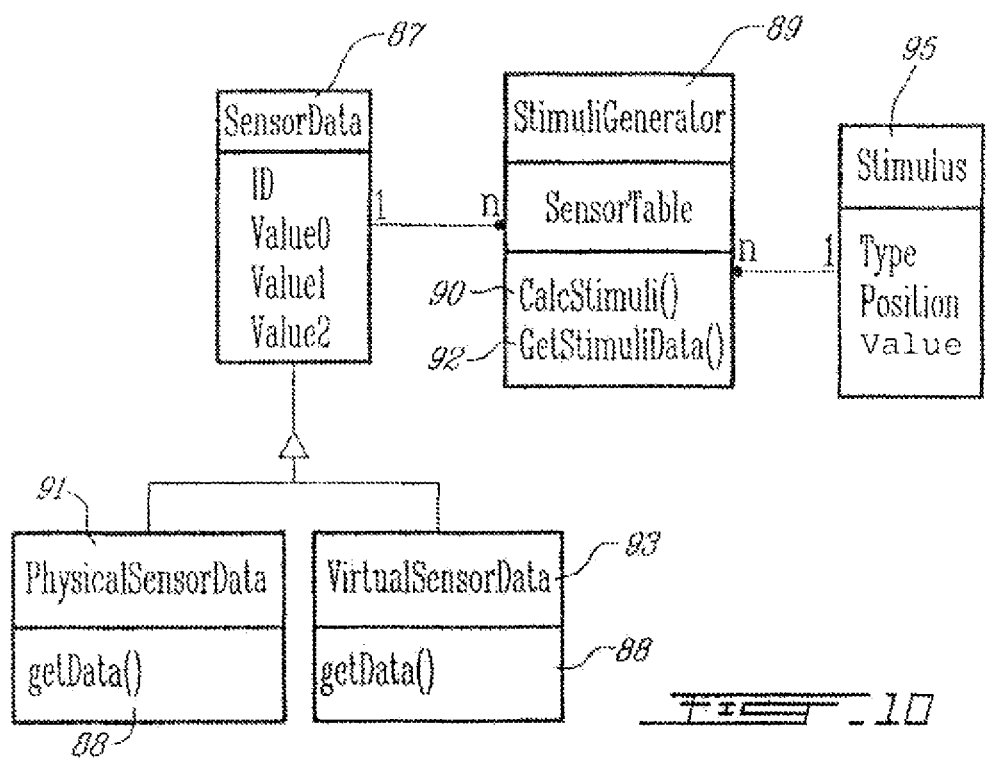

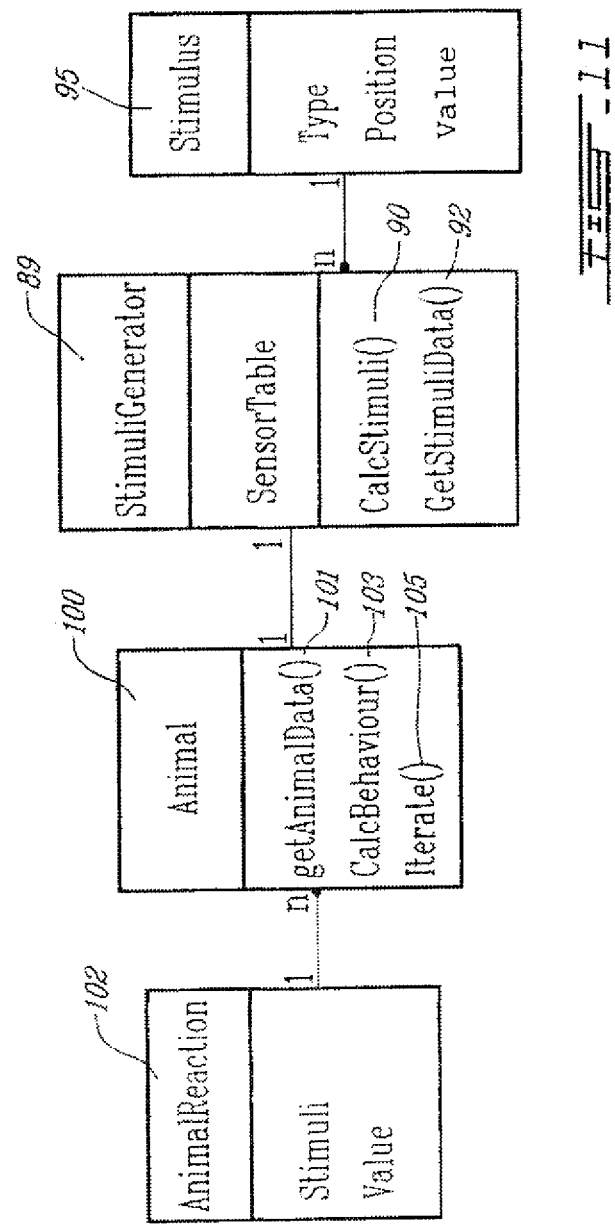

UNITED STATES PATENT AND TRADEMARK OFFICE
CERTIFICATE OF CORRECTION

PATENT NO. : 6,507,353 B1
APPLICATION NO. : 09/459049
DATED : January 14, 2003
INVENTOR(S) : Godot Huard and Philippe Fortier It is certified that error appears in the above-identified patent and that said Letters Patent is hereby corrected as shown below:

In the Claims:

In claim 5, at column 16, line 39, change "body language detectors" to -- and body language detectors --.
In claim 8, at column 16, lines 47-48, change "analyzes said" to -- reads information from said --.
In claim 12, at column 16, line 61, change "or" to -- and --.
In claim 13, at column 16, lines 63-67, change:
" 13. A method as claimed in claim 12, wherein said generating a behavior vector comprises adding a reaction for each physical characteristic signal, using said behavior model and said position information to an overall reaction to generate a behavior vector."
to
-- 13. A method as claimed in claim 12, wherein generating said behavior vector comprises adding reactions for each said at least one physical characteristic signal to form an overall reaction. --.
In claim 15, at column 17, lines 6-11, change:
"15. A method as claimed in claim 12, wherein each physical characteristic signal of a similar type is summed into a physical signal for said type and wherein a reaction for said physical signal for said type is calculated, using said behavior model and said position information to an overall reaction to generate a behavior vector."
to
-- 15. A method as claimed in claim 12, wherein each physical characteristic signal of a type of stimulus is summed into a summed physical characteristic signal for said type of stimulus, and wherein an overall reaction for said summed physical characteristic signal, for said type of stimulus, is calculated, to generate a behavior vector. --.
In claim 16, at column 17, line 15, change:
"$N=\Sigma(F_{i0} * S_i(t) + F_{i1} \cdot S_i(t)/\delta t + F_{i2} * S_i(t)\delta t^2))/d$"
to
-- $N=\Sigma(F_{i0} * S_i(t) + F_{i1} * S_i(t)/\delta t + F_{i2} * S_i(t)\delta t^2)/d$ --.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 6,507,353 B1

In claim 16, at column 17, line 21, delete "(Sonic, visual, etc.)".

In claim 17, at column 17, lines 23-24, change:

"17. A method as claimed in claim 1, wherein said visitor can be an adult, a child or an animal."

to

-- 17. A method as claimed in claim 1, wherein said visitor is an adult, a child or an animal. --

In claim 18, at column 17, lines 25-32, change:

"18. A method as claimed in claim 1, wherein said behavior model comprises, for each psychological factor, a list of parameters comprising a type of stimuli to which it responds, an order of the derivative of said physical characteristic signal, a condition and a reaction eqauation and wherein said behavior vector is first calculated for each physical characteristic signal and then summed to generate an overall behavior vector."

to

-- 18. A method as claimed in claim 1, wherein said behavior model comprises at least one psychological factor, wherein, for each one of said at least one psychological factor, said behavior model comprises a list of parameters comprising: a type of stimuli to which said each one of said at least one psychological factor responds; an order of the derivative of said at least one physical characteristic signal; a condition; and a reaction equation; and wherein said behavior vector is first calculated for each physical characteristic signal and then summed to generate an overall behavior vector. --.

In claim 19, at column 18, lines 1-7, change:

"19. A method as claimed in claim 18, wherein said behavior model comprises psychological factors, wherein said psychological factors are at least one of age factor, hunger, thirst, sleepiness, attention span and disability and wherein said list of parameters for the psychological factor of hunger is"

to

-- 19. A method as claimed in claim 18, wherein said at least one psychological factor is at least one of: age factor; hunger; thirst; sleepiness; attention span; and disability; and wherein said list of parameters for the psychological factor of hunger is --.

In claim 22, at column 18, line 27, change "whrein" to -- wherein --.